US012717529B2

(12) United States Patent
Soma

(10) Patent No.: US 12,717,529 B2
(45) Date of Patent: Aug. 25, 2026

(54) STORAGE MEDIUM, CONTROL METHOD FOR INFORMATION PROCESSING APPARATUS CAPABLE OF OPERATING PRINTING DEVICE, AND INFORMATION PROCESSING APPARATUS

(71) Applicant: CANON KABUSHIKI KAISHA, Tokyo (JP)

(72) Inventor: Takahiro Soma, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/734,008

(22) Filed: Jun. 5, 2024

(65) Prior Publication Data

US 2024/0419377 A1 Dec. 19, 2024

(30) Foreign Application Priority Data

Jun. 14, 2023 (JP) ................................ 2023-097839

(51) Int. Cl.
*H04N 1/04* (2006.01)
*G06F 3/12* (2006.01)

(52) U.S. Cl.
CPC .......... *G06F 3/1247* (2013.01); *G06F 3/1204* (2013.01); *G06F 3/1285* (2013.01)

(58) Field of Classification Search
USPC ............................................... 358/1.13, 1.15
See application file for complete search history.

(56) References Cited

U.S. PATENT DOCUMENTS 11,531,507 B2 12/2022 Nakagawa
2023/0086590 A1 3/2023 Nakagawa
2024/0419377 A1* 12/2024 Soma .................... G06F 3/1206

FOREIGN PATENT DOCUMENTS

JP 2020-046741 A 3/2020

* cited by examiner

*Primary Examiner* — Cheukfan Lee
(74) *Attorney, Agent, or Firm* — VENABLE LLP

(57) ABSTRACT

An information processing apparatus is controlled so as to perform processing suitable for a printing device communicably connected to the information processing apparatus. In a control method for the information processing apparatus, a first format file output from a document creation application is converted to a second format file. According to information indicating whether the conversion is enabled or disabled included in print setting information obtained from the printing device, a processing mode is set to either a mode in which the conversion is performed on a file output from the document creation application or a mode in which a file output from the document creation application is output as it is without being subjected to the conversion. Print data generated according to the set processing mode is sent to the printing device.

19 Claims, 37 Drawing Sheets

FIG. 5

| ITEM NAME | ATTRIBUTE VALUE | DEFAULT VALUE |
|---|---|---|
| PAPER SIZE | A6 /A5 /A4 /B5 /Letter /Legal /Executive /POSTCARD /#10 ENVELOPE PORTRAIT /DL ENVELOPE PORTRAIT /ENVELOPE (JIS Y4) PORTRAIT /ENVELOPE (JIS N3) PORTRAIT /ENVELOPE (JIS N4) PORTRAIT /ENVELOPE C5 PORTRAIT /ENVELOPE MONARCH PORTRAIT /L /4 X 6(KG SIZE) /5 X 7 /203 mm X 254 mm (8 X 10)/SQUARE (127 mm) /BUSINESS CARD (CARD) /ENVELOPE (JIS Y6) PORTRAIT /SQUARE (89 mm) /SQUARE (4 X 4) | A4 |
| PAPER TYPE | ENVELOPE /LABEL /PLANE PAPER /PHOTO PAPER /PHOTO PAPER GLOSSY STANDARD /PHOTO PAPER SEMI-GLOSS /POSTCARD PAPER FOR INKJET PRINTER (MESSAGE SIDE) /POSTCARD PAPER FOR INKJET PRINTER (ADDRESS SIDE) /POSTCARD PHOTO PAPER FOR INKJET PRINTER (MESSAGE SIDE) /POSTCARD PHOTO PAPER FOR INKJET PRINTER (ADDRESS SIDE) | PLANE PAPER |
| NUMBER OF COPIES | Max=99 | 1 |
| 501 PDF PASS-THROUGH | ON/OFF | ON |
| CHANGE LANGUAGE | JAPANESE／English／French／German／Italian／Spanish／Portuguese ／Dutch／Danish／Norwegian／Swedish／Finnish／Polish／Czech ／Russian／Turkish／Chinese(Simplified)／Chinese(Traditional)／Korean ／Thai／Indonesian | JAPANESE |

```
<?xml version="1.0" encoding="utf-8"?>
<PrintDeviceCapabilities
  xmlns:xsi="http://AAA"
  xmlns:xsd="http://BBB"
  xmlns:xml="http://CCC"
  xmlns:psk="http://DDD"
  xmlns:psk12="http://EEE"
  xmlns:psf="http://FFF"
  xmlns:psf2="http://GGG"
  xmlns="http://HHH"
  version="2">

   <psk:PageMediaSize psf2:psftype="Feature">
      <psk:ISOA4 psf2:psftype="Option">
        <psk12:PortraitImageableSize xsi:type="psf2:ImageableAreaType" psf2:psftype="Property">12700,12700,184600,271600</psk12:PortraitImageableSize>
         <psk:MediaSizeHeight xsi:type="xsd:integer" psf2:psftype="ScoredProperty">297000</psk:MediaSizeHeight>
         <psk:MediaSizeWidth xsi:type="xsd:integer" psf2:psftype="ScoredProperty">210000</psk:MediaSizeWidth>
      </psk:ISOA4>
      <psk:NorthAmericaLetter psf2:psftype="Option" psf2:default="true">
        <psk12:PortraitImageableSize xsi:type="psf2:ImageableAreaType" psf2:psftype="Property">12700,12700,190500,254000</psk12:PortraitImageableSize>
         <psk:MediaSizeHeight xsi:type="xsd:integer" psf2:psftype="ScoredProperty">279400</psk:MediaSizeHeight>
         <psk:MediaSizeWidth xsi:type="xsd:integer" psf2:psftype="ScoredProperty">215900</psk:MediaSizeWidth>
      </psk:NorthAmericaLetter>
   </psk:PageMediaSize>

   <psk:PageOrientation psf2:psftype="Feature">
      <psk:Landscape psf2:psftype="Option"/>
      <psk:Portrait psf2:psftype="Option" psf2:default="true"/>
   </psk:PageOrientation>

   <psk:PageOutputColor psf2:psftype="Feature">
      <psk:Color psf2:psftype="Option" psf2:default="true">
         <psk:DeviceBitsPerPixel xsi:type="xsd:integer" psf2:psftype="ScoredProperty">24</psk:DeviceBitsPerPixel>
         <psk:DriverBitsPerPixel xsi:type="xsd:integer" psf2:psftype="ScoredProperty">24</psk:DriverBitsPerPixel>
      </psk:Color>
   </psk:PageOutputColor>
</PrintDeviceCapabilities>
```

```
<?xml version="1.0" encoding="UTF-8"?>
<PrintDeviceCapabilities
  xmlns:xsi="http://AAA"
  xmlns:xsd="http://BBB"
  xmlns:xml="http://CCC"
  xmlns:psk="http://DDD"
  xmlns:psk12="http://EEE"
  xmlns:psf="http://FFF"
  xmlns:psf2="http://GGG"
  xmlns="http://HHH"
  version="2">
    <!-- media-default, media-supported, media-col-database -->
      <psk:PageMediaSize psf2:psftype="Feature">
       <psk:JapanHagakiPostcard psf2:psftype="Option" psf2:default="false">
          <psk:MediaSizeWidth xsi:type="xsd:integer" psf2:psftype="ScoredProperty">100000</psk:MediaSizeWidth>
          <psk:MediaSizeHeight xsi:type="xsd:integer" psf2:psftype="ScoredProperty">148000</psk:MediaSizeHeight>
        <psk12:PortraitImageableSize xsi:type="psf2:ImageableAreaType" psf2:psftype="Property">3400,5000,93200,138000</psk12:PortraitImageableSize>
        <psk12:BorderlessImageableSize xsi:type="psf2:ImageableAreaType" psf2:psftype="Property">0,0,100000,148000</psk12:BorderlessImageableSize>
       </psk:JapanHagakiPostcard>
       <psk:ISOA5 psf2:psftype="Option" psf2:default="false">
          <psk:MediaSizeWidth xsi:type="xsd:integer" psf2:psftype="ScoredProperty">148000</psk:MediaSizeWidth>
          <psk:MediaSizeHeight xsi:type="xsd:integer" psf2:psftype="ScoredProperty">210000</psk:MediaSizeHeight>
        <psk12:PortraitImageableSize xsi:type="psf2:ImageableAreaType" psf2:psftype="Property">3400,5000,141200,200000</psk12:PortraitImageableSize>
        <psk12:BorderlessImageableSize xsi:type="psf2:ImageableAreaType" psf2:psftype="Property">0,0,148000,210000</psk12:BorderlessImageableSize>
       </psk:ISOA5>

       <psk:ISOA4 psf2:psftype="Option" psf2:default="false">
          <psk:MediaSizeWidth xsi:type="xsd:integer" psf2:psftype="ScoredProperty">210000</psk:MediaSizeWidth>
          <psk:MediaSizeHeight xsi:type="xsd:integer" psf2:psftype="ScoredProperty">297000</psk:MediaSizeHeight>
        <psk12:PortraitImageableSize xsi:type="psf2:ImageableAreaType" psf2:psftype="Property">3400,5000,203200,287000</psk12:PortraitImageableSize>
        <psk12:BorderlessImageableSize xsi:type="psf2:ImageableAreaType" psf2:psftype="Property">0,0,210000,297000</psk12:BorderlessImageableSize>
       </psk:ISOA4>
    </psk:PageMediaSize>

    <!-- orientation-requested-default -->
    <psk:PageOrientation psf2:psftype="Feature">
       <psk:Portrait psf2:psftype="Option" psf2:default="true"/>
       <psk:Landscape psf2:psftype="Option" psf2:default="false"/>
       <psk:ReverseLandscape psf2:psftype="Option" psf2:default="false"/>
    </psk:PageOrientation>

</PrintDeviceCapabilities>
```

```
[Version]
Signature = "$AAA BB$"
Class = Extension
ClassGuid = {abcdefab-12ab-34cd-56ef-555555555555}
Provider = %ManufacturerName%
ExtensionId = {AAABBBCCC-111A-222B-333C-ABCD12345}
CatalogFile = App.cat
DriverVer = 08/19/2023,12.00.00.001


[Strings]
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
StoreType = 2
PrinterHardwareId = "PrinterApp_device001"
```

QUEUE ID = 1

1401 1402

| ITEM NAME | ATTRIBUTE VALUE | SETTING VALUE |
|---|---|---|
| PAPER SIZE | A6 /A5 /A4 /B5 /Letter /Legal /Executive /POSTCARD /#10 ENVELOPE PORTRAIT /DL ENVELOPE PORTRAIT /ENVELOPE (JIS Y4) PORTRAIT /ENVELOPE (JIS N3) PORTRAIT /ENVELOPE (JIS N4) PORTRAIT /ENVELOPE C5 PORTRAIT /ENVELOPE MONARCH PORTRAIT /L /4 X 6(KG SIZE) /5 X 7 /203 X 254 mm (8 X 10)/SQUARE (127 mm) /BUSINESS CARD (CARD) /ENVELOPE (JIS Y6) PORTRAIT /SQUARE (89 mm) /SQUARE (4 X 4) | A4 |
| PAPER TYPE | ENVELOPE /LABEL /PLANE PAPER /PHOTO PAPER /PHOTO PAPER GLOSSY STANDARD /PHOTO PAPER SEMI-GLOSS /POSTCARD PAPER FOR INKJET PRINTER (MESSAGE SIDE) /POSTCARD PAPER FOR INKJET PRINTER (ADDRESS SIDE) /POSTCARD PHOTO PAPER FOR INKJET PRINTER (MESSAGE SIDE) /POSTCARD PHOTO PAPER FOR INKJET PRINTER (ADDRESS SIDE) | PLANE PAPER |
| NUMBER OF COPIES | Max=99 | 1 |
| PAGE ORIENTATION | PORTRAIT/LANDSCAPE | PORTRAIT |
| STORE JOB IN PRINTER | ON/OFF | OFF |
| SHORTEN JOB NAME | ON/OFF | OFF |
| PDF PASS-THROUGH | ON/OFF | ON |

FIG. 14B

QUEUE ID = 2

1401 1402

| ITEM NAME | ATTRIBUTE VALUE | SETTING VALUE |
|---|---|---|
| PAPER SIZE | A6 /A5 /A4 /B5 /Letter /Legal /Executive /POSTCARD /#10 ENVELOPE PORTRAIT /DL ENVELOPE PORTRAIT /ENVELOPE (JIS Y4) PORTRAIT /ENVELOPE (JIS N3) PORTRAIT /ENVELOPE (JIS N4) PORTRAIT /ENVELOPE C5 PORTRAIT /ENVELOPE MONARCH PORTRAIT /L /4 X 6(KG SIZE) /5 X 7 /203 X 254 mm (8 X 10)/SQUARE (127 mm) /BUSINESS CARD (CARD) /ENVELOPE (JIS Y6) PORTRAIT /SQUARE (89 mm) /SQUARE (4 X 4) | Letter |
| PAPER TYPE | ENVELOPE /LABEL /PLANE PAPER /PHOTO PAPER /PHOTO PAPER GLOSSY STANDARD /PHOTO PAPER SEMI-GLOSS /POSTCARD PAPER FOR INKJET PRINTER (MESSAGE SIDE) /POSTCARD PAPER FOR INKJET PRINTER (ADDRESS SIDE) /POSTCARD PHOTO PAPER FOR INKJET PRINTER (MESSAGE SIDE) /POSTCARD PHOTO PAPER FOR INKJET PRINTER (ADDRESS SIDE) | ENVELOPE |
| NUMBER OF COPIES | Max=99 | 1 |
| PAGE ORIENTATION | PORTRAIT/LANDSCAPE | PORTRAIT |
| STORE JOB IN PRINTER | ON/OFF | OFF |
| SHORTEN JOB NAME | ON/OFF | OFF |
| PDF PASS-THROUGH | ON/OFF | OFF |

FIG. 14C

QUEUE ID = n 1401 1402

| ITEM NAME | ATTRIBUTE VALUE | SETTING VALUE |
|---|---|---|
| PAPER SIZE | A6 /A5 /A4 /B5 /Letter /Legal /Executive /POSTCARD /#10 ENVELOPE PORTRAIT /DL ENVELOPE PORTRAIT /ENVELOPE (JIS Y4) PORTRAIT /ENVELOPE (JIS N3) PORTRAIT /ENVELOPE (JIS N4) PORTRAIT /ENVELOPE C5 PORTRAIT /ENVELOPE MONARCH PORTRAIT /L /4 X 6(KG SIZE) /5 X 7 /203 X 254 mm (8 X 10)/SQUARE (127 mm) /BUSINESS CARD (CARD) /ENVELOPE (JIS Y6) PORTRAIT /SQUARE (89 mm) /SQUARE (4 X 4) | POSTCARD |
| PAPER TYPE | ENVELOPE /LABEL /PLANE PAPER /PHOTO PAPER /PHOTO PAPER GLOSSY STANDARD /PHOTO PAPER SEMI-GLOSS /POSTCARD PAPER FOR INKJET PRINTER (MESSAGE SIDE) /POSTCARD PAPER FOR INKJET PRINTER (ADDRESS SIDE) /POSTCARD PHOTO PAPER FOR INKJET PRINTER (MESSAGE SIDE) /POSTCARD PHOTO PAPER FOR INKJET PRINTER (ADDRESS SIDE) | PLANE PAPER |
| NUMBER OF COPIES | Max=99 | 1 |
| PAGE ORIENTATION | PORTRAIT/LANDSCAPE | PORTRAIT |
| STORE JOB IN PRINTER | ON/OFF | OFF |
| SHORTEN JOB NAME | ON/OFF | OFF |
| PDF PASS-THROUGH | ON/OFF | ON |

```
<Filters>
  <Filter dll="PDFAAAA.dll" clsid="{AA012B34-C567-8A01-B222-33AB44DDE555}" name="ABC XPS to PDF">
    <Input guid="{a1bb1234-5567-89a1-bc23-f1f23efa123e}" Comment="IID_IXpsDocumentProvider"/>
    <Output guid="{56aa7b7c-987a-6543-2ab1-234a567b8a91}" comment="IID_IPrintWriteStream"/>
  </Filter>
  <FilterServiceProvider dll="XPSXXXService.dll"/>
</Filters>
```

| PRINTER NAME | HW ID | QUEUE ID |
|---|---|---|
| cloud Printer A | 1 | 1 |
| cloud Printer B | 2 | 2 |
| cloud Printer C | 1 | 3 |

STORAGE MEDIUM, CONTROL METHOD FOR INFORMATION PROCESSING APPARATUS CAPABLE OF OPERATING PRINTING DEVICE, AND INFORMATION PROCESSING APPARATUS

BACKGROUND OF THE INVENTION

Field of the Invention

The present invention relates to an information processing apparatus capable of operating a printing device communicably connected to the information processing apparatus, a control method for the information processing apparatus, and a storage medium.

Description of the Related Art

Some general-purpose printer drivers (local printer drivers) that have been discussed in recent years communicate with printers and perform printing, using an industry-standard protocol, such as the Internet printing protocol (IPP). General-purpose printer drivers (cloud printer drivers) that communicate with a cloud print server have also been discussed. General-purpose printer drivers are capable of communicating with printers offered by a plurality of printer vendors, and users can use the general-purpose printer drivers to perform printing by transmitting print data to printers connected to their respective personal computers (PCs) or to a cloud print server without installing vendor-specific printer drivers on their PCs.

In conventional printing using general-purpose printer drivers, a file output from an application is converted to XPS (XML Paper Specification) format once. The file in XPS format is then converted to PDF (Portable Document Format) and transmitted to a printer (see Japanese Patent Laid-Open Publication (Kokai) No. 2020-46741).

On the other hand, some applications for PCs are capable of outputting PDF files directly. For such applications capable of outputting PDF files directly, it is now contemplated skipping a process of converting PDF files to XPS format in printing using the general-purpose printer drivers, that is, sending PDF files output from such applications directly to printers.

If such direct printing of PDF files is realized, it is assumed that the following will occur. When performing printing using the general-purpose printer drivers, users will choose whether to convert a file output from an application to XPS format first and then print the converted file, as in conventional printing, or to directly print a PDF file output from an application. It is assumed that this choice is made on a print setting screen of the general-purpose printer driver.

In other words, if direct printing of PDF files using the general-purpose printer drivers is realized, some users will choose, on every printer, settings to perform the direct printing or settings to perform printing after converting a file to XML format.

In cases where a printer with a low-performance CPU processes a PDF file generated by an application as it is, the printer may take long time in a process of analyzing transparent objects contained in the PDF file (transparency process). For printers with low-performance CPUs, in consideration of printing speed, users may choose to print PDF files by converting the files to XPS format so as to avoid the transparency process. On the other hand, for printers with high-performance CPUs, in order to improve image quality, users may choose to print PDF files generated by applications as they are, without avoiding the transparency process, which is hereinafter referred to as PDF pass-through or PDF pass-through printing. Therefore, cases where users switch the file conversion mode for printing on every printer are assumed, which is very troublesome for users.

SUMMARY OF THE INVENTION

One or more aspects of the present invention are direct to provide information processing apparatuses which perform processing suitable for any printing devices.

According to an aspect of the invention, a non-transitory computer-readable storage medium stores an application program for causing a computer to execute a control method for an information processing apparatus that operates a printing device communicably connected to the information processing apparatus. The control method includes: performing a conversion of a first format file output from a document creation application into a second format file; and obtaining print setting information on print settings from the printing device, where the print setting information includes information indicating whether the conversion is enabled or disabled. The control method further includes, according to the information indicating whether the conversion is enabled or disabled included in the obtained print setting information, setting a processing mode for a file output from the document creation application to either a mode in which the conversion is performed on a file output from the document creation application or a mode in which a file output from the document creation application is output as it is without being subjected to the conversion. The control method further includes transmitting print data to the printing device, where the print data is generated based on either the file output from the document creation application or a file obtained by performing the conversion on the file output from the document creation application, according to the set processing mode.

According to another aspect of the invention, a non-transitory computer-readable storage medium stores an application program for causing a computer to execute a control method for an information processing apparatus that operates a printing device communicably connected to the information processing apparatus, where the application program supports a function of a standard driver installed on an operating system of the information processing apparatus. The control method includes: performing a conversion of a first format file output from a document creation application into a second format file; and obtaining capability information from the printing device, where the capability information includes information indicating whether the conversion is enabled or disabled. The control method further includes, according to the information indicating whether the conversion is enabled or disabled included in the obtained capability information, setting a processing mode for a file output from the document creation application to either a mode in which the conversion is performed on a file output from the document creation application or a mode in which a file output from the document creation application is output as it is without being subjected to the conversion. The control method further includes transmitting print data to the printing device, where the print data is generated based on either the file output from the document creation application or a file obtained by performing the conversion on the file output from the document creation application, according to the set processing mode.

Further features of the present invention will become apparent from the following description of exemplary embodiments with reference to the attached drawings.

BRIEF DESCRIPTION OF THE DRAWINGS

FIG. 5 is a diagram illustrating an example of capability information on a cloud print compatible printer.

FIG. 6A is a diagram illustrating an example of device capability information bundled with an operating system (OS).

FIG. 6B is a diagram illustrating an example of the device capability information extended with information obtained from a cloud print service unit.

FIG. 7 is a diagram illustrating an example of an extension setup information file obtained from an online support service unit.

FIGS. 14A to 14C are diagrams illustrating examples of device capability information tables that are managed for respective print queues.

FIG. 17 is a diagram illustrating an example of page description language (PDL) information that is written into device capability information and can be processed by cloud print compatible printers.

FIG. 19 is a diagram illustrating an example of a table with which print queues are managed by the print setting extension application in the second example.

DESCRIPTION OF THE EMBODIMENTS

A detailed description will now be given of various embodiments with reference to the accompanying drawings. It should be noted, however, that configurations in the embodiments described below are examples for illustrative purposes only, and the scope of claims is not limited to configurations in the embodiments described below. In the following description, an application that extends a print setting function of a standard driver installed on the OS of a client terminal 101 is referred to as a print setting extension application. A general-purpose printer driver is also sometimes referred to as a standard driver.

Figure 1:
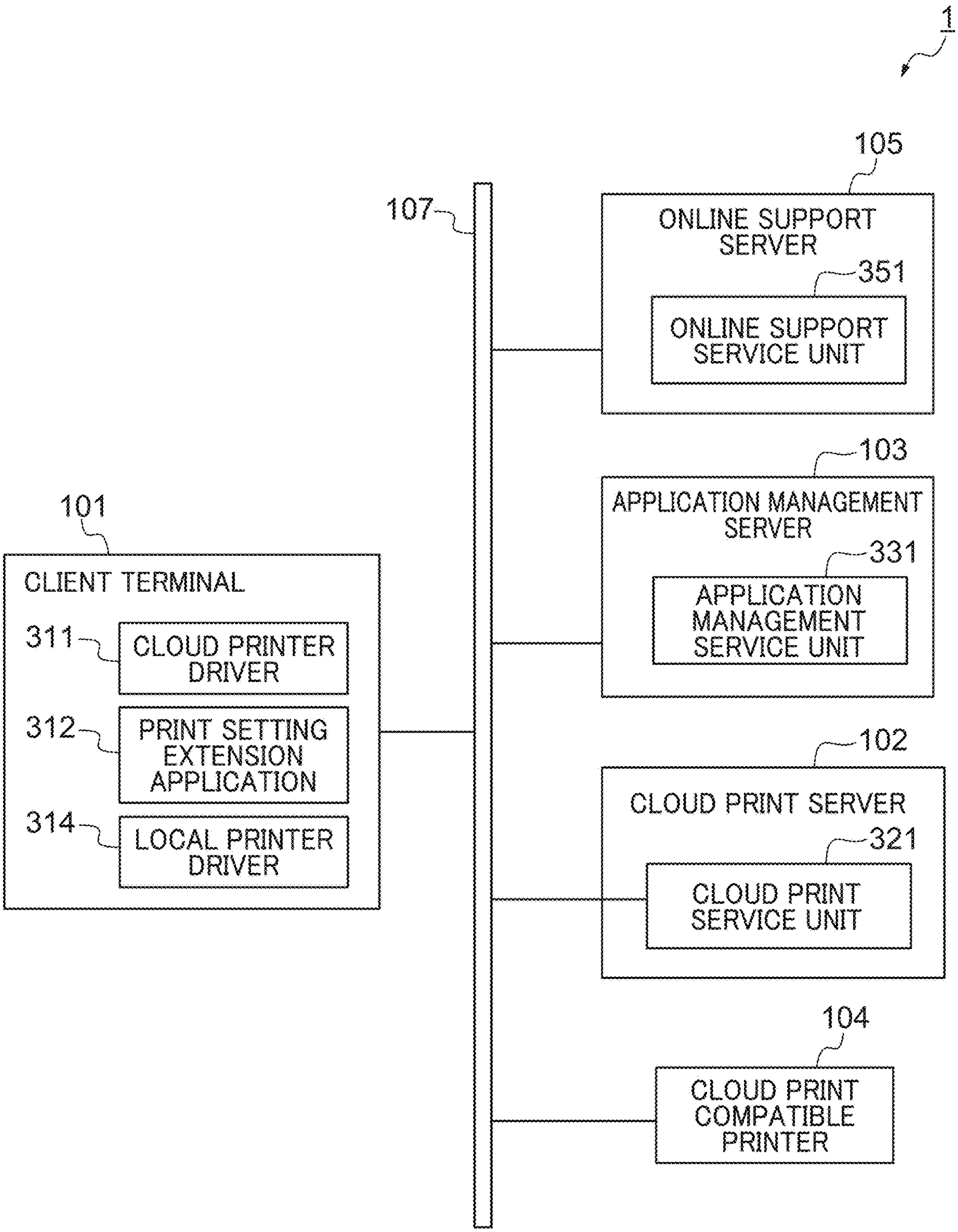
FIG. 1 is a configuration diagram illustrating an example of a printing system according to an embodiment.

FIG. 1 is a configuration diagram illustrating an example of a printing system 1 according to the present embodiment. The printing system 1 includes the client terminal 101, a cloud print server 102, an application management server 103, a cloud print compatible printer 104, and an online support server 105. They are connected to one another via a network 107 such that they are able to communicate with one another.

FIG. 1 illustrates only one client terminal 101 and one cloud print compatible printer 104. Alternatively, a plurality of client terminals 101 and a plurality of cloud print compatible printers 104 may be provided. The cloud print server 102, the application management server 103, a cloud print compatible printer 104, and the online support server 105 may be each constituted by a plurality of information processing apparatuses. The servers 102, 103, 105 may be each provided as a server system comprised of a plurality of information processing apparatuses so as to distribute load.

Alternatively, the cloud print server 102, the application management server 103, and the online support server 105 may be virtually realized inside one physical information processing apparatus.

The network 107 is assumed to be a wide area network (WAN), such as the Internet, for connection to the cloud service, but alternatively, the network 107 may be in a closed environment, such as a company local area network (LAN).

In the client terminal 101, a cloud print driver 311, a print setting extension application 312, and a local printer driver 314 are installed on the OS of the client terminal 101, which is not illustrated in FIG. 1. The client terminal 101 is an information processing apparatus, such as a PC, a tablet, or a smartphone, and works also as a terminal that can be directly operated by a user. In the client terminal 101, any application software can be executed on the OS and middleware.

The cloud print compatible printer 104 is a printing device that actually preforms printing on printing media, such as printing sheets. For example, the cloud print compatible printer 104 is an image forming apparatus (multifunction peripheral or MFP) equipped with a plurality of functions including a printing function of converting print data, which is received via the network 107, to image data and then printing the image data, a faxing function, and a copying function. The cloud print compatible printer 104 is capable of both receiving print data from the client terminal 101 via the cloud print server 102 and receiving print data directly from the client terminal 101 not via the cloud print server 102.

The cloud print compatible printer 104 is capable of receiving print data, which is created by the cloud print driver 311 installed in the client terminal 101, via the cloud print server 102. The cloud print compatible printer 104 is also capable of receiving print data, which is created by the local printer driver 314 installed on the client terminal 101, not via the cloud print server 102 and printing the print data.

The cloud print server 102 includes a cloud print service unit 321. The cloud print service unit 321 is configured to receive a print instruction and print data from the outside. The cloud print service unit 321 is configured to send the received print data to the cloud print compatible printer 104 designated in the print data. It should be noted that in the description of the present embodiment, image data and print setting information are collectively rereferred to as print data.

The application management server 103 includes an application management service unit 331. The application management service unit 331 holds and manages various applications. The application management service unit 331 is configured to receive identification information on an application and a download request from the client terminal 101, and then send the application identified based on the received identification information to the client terminal 101.

The online support server 105 includes an online support service unit 351. The online support service unit 351 provides an online support service. The online support service unit 351 serves as a server apparatus for providing the client terminal 101 with an extension setup information file in which information for extending the functions of the client terminal 101 is described.

Next, referring to FIGS. 2A to 2E, a description will be given of the configurations of the cloud print server 102, the application management server 103, the online support server 105, the client terminal 101, and the cloud print compatible printer 104 in the printing system 1 according to the present embodiment.

Figure 2A:
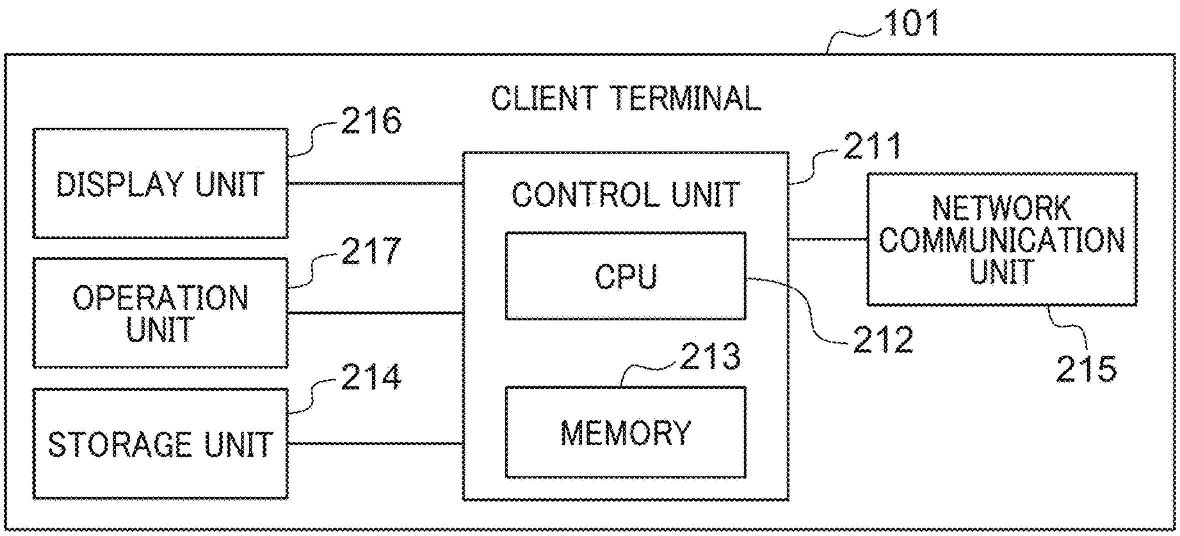
FIGS. 2A to 2E are configuration diagrams illustrating examples of a client terminal and others constituting the printing system according to the embodiment.

FIG. 2A is a configuration diagram illustrating the client terminal 101. The client terminal 101 includes a display unit 216, an operation unit 217, a storage unit 214, a control unit 211, and a network communication unit 215. The display unit 216 is a display device, such as a liquid crystal display (LED), for displaying visual information to a user. The operation unit 217 is an input device or devices, such as a keyboard and a mouse, for receiving inputs from a user. The storage unit 214 is a nonvolatile and rewritable storage device, such as a hard disk drive (HDD), a solid state drive (SSD), or a flash memory. It should be noted that a device such as a touch panel equipped with the functions of both the display unit 216 and the operation unit 217 may be employed in the client terminal 101.

The control unit 211 includes a central processing unit (CPU) 212 and a memory 213 and is configured to control the overall operation of the client terminal 101. The CPU 212 loads a program stored in the storage unit 214 onto the memory 213 and executes the loaded program. The memory 213 is a main storage memory for the CPU 212 and has a work area and a temporary storage area for loading various programs. The network communication unit 215 is configured to send and receive digital data to and from the external servers 102, 103, 105 and the cloud print compatible printer 104 via the network 107.

Figure 2B:
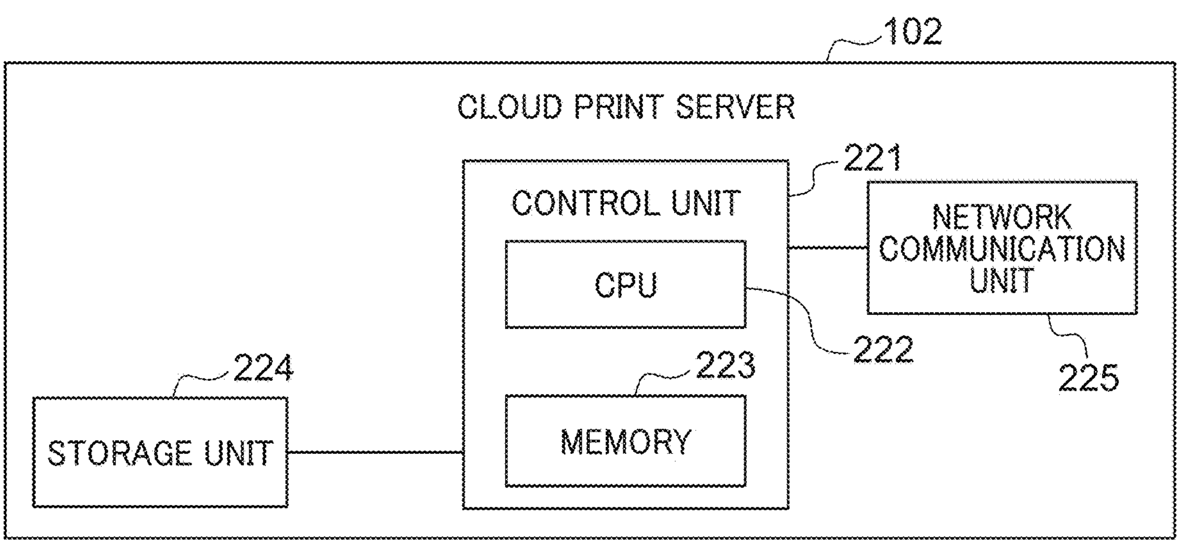

FIG. 2B is a configuration diagram illustrating the cloud print server 102. The cloud print server 102 includes a storage unit 224, a control unit 221, and a network communication unit 225. The storage unit 224, the control unit 221, and the network communication unit 225 are equivalent to the corresponding ones in the client terminal 101, and hence description thereof is omitted.

It should be noted that although in the present embodiment, the cloud print server 102 is constituted by one information processing apparatus as illustrated in FIG. 2B, the cloud print server 102 may be a server system comprised of a plurality of information processing apparatuses. Programs for various services provided by the cloud print server 102 are stored in the storage unit 224 of the cloud print server 102 such that they are nonvolatile. The programs are loaded onto a memory 223 at the startup of the cloud print server 102, and the loaded programs are executed by a CPU 222 to implement the cloud print service unit 321.

Figure 2C:
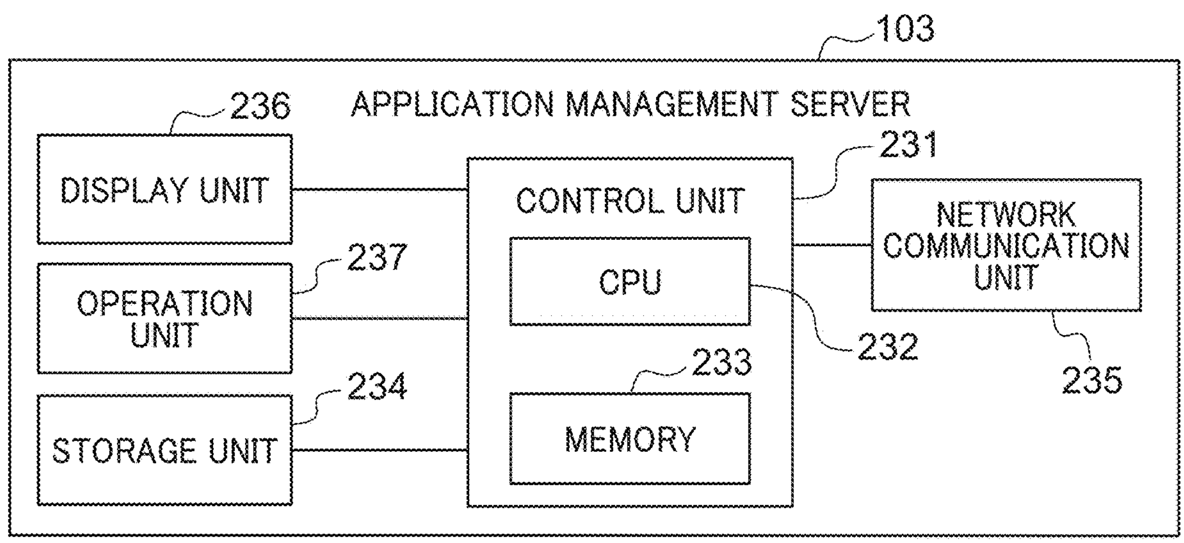

FIG. 2C is a configuration diagram illustrating the application management server 103. The application management server 103 includes a display unit 236, an operation unit 237, a storage unit 234, a control unit 231, and a network communication unit 235. The display unit 236, the operation unit 237, the storage unit 234, the control unit 231, and the network communication unit 235 are equivalent to the corresponding ones in the client terminal 101, and hence description thereof is omitted.

Programs for various services provided by the application management server 103 are stored in the storage unit 234 of the application management server 103 such that they are nonvolatile. The programs are loaded onto a memory 233 at the startup of the application management server 103, and the loaded programs are executed by a CPU 232 to implement the application management server 103.

It should be noted that although in the present embodiment, the application management server 103 is comprised of one information processing apparatus as illustrated in FIG. 2C, the application management server 103 may be a server system comprised of a plurality of information processing apparatuses.

Figure 2D:
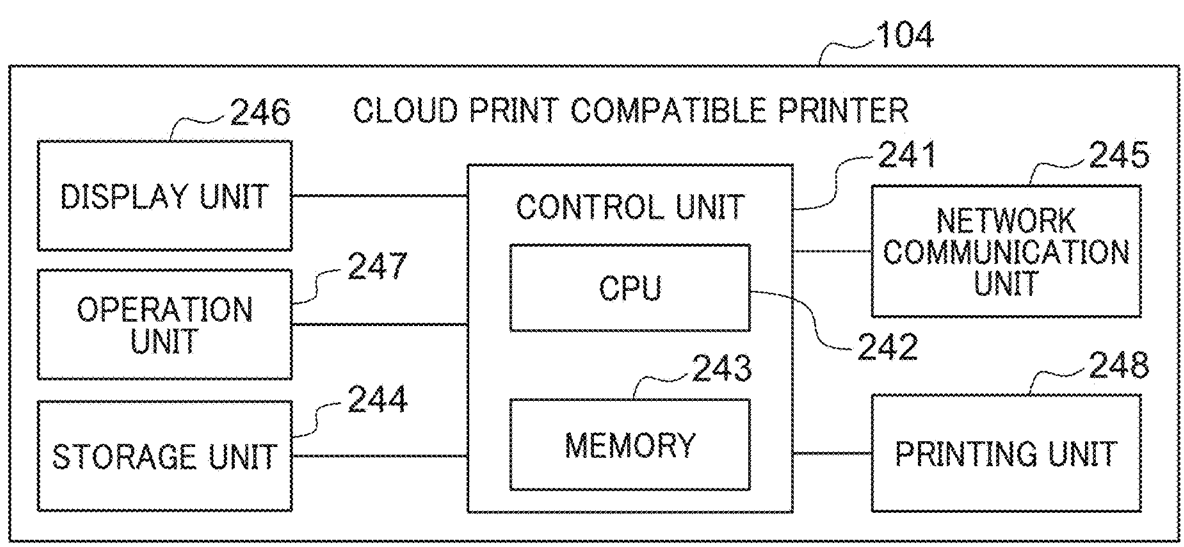

FIG. 2D is a configuration diagram illustrating the cloud print compatible printer 104. The cloud print compatible printer 104 includes a display unit 246, an operation unit 247, a storage unit 244, a control unit 241, a network communication unit 245, and a printing unit 248. The control unit 241 includes a CPU 242 and a memory 243 and is configured to control the overall operation of the cloud print compatible printer 104.

The display unit 246 is a display device, such as a touch panel or an LED, which is provided in the cloud print compatible printer 104, for displaying visual information to a user. The operation unit 247 is an input device or devices for receiving inputs from a user and may include hard keys such as a numeric keypad as well as a touch panel that is touch-controllable. The storage unit 244 and the control unit 241 are equivalent to the corresponding ones in the client terminal 101, and hence description thereof is omitted.

The network communication unit 245 is configured to communicate with the external network 107. The network communication unit 245 is configured to mainly receive print data and also has a function of sending information indicating its own state such as error information to an external server.

The printing unit 248 is configured to carry out a printing process by using sheets, which are printing media prepared in cassettes and trays, to perform a sequence of actions comprised of sheet feeding, printing, and sheet output.

Examples of the printing method include, but are not limited to, an electrophotographic method and an ink-jet method. The printing unit 248 includes a double-sided unit, which is used to output sheets, and finishing devices for stapling and punching, for example. It should be noted that although in the present embodiment, a single-function printer that performs only the printing function is taken as an example of the cloud print compatible printer 104, a multifunction peripheral equipped with a plurality of functions (e.g. an MFP) may also be used.

Figure 2E:
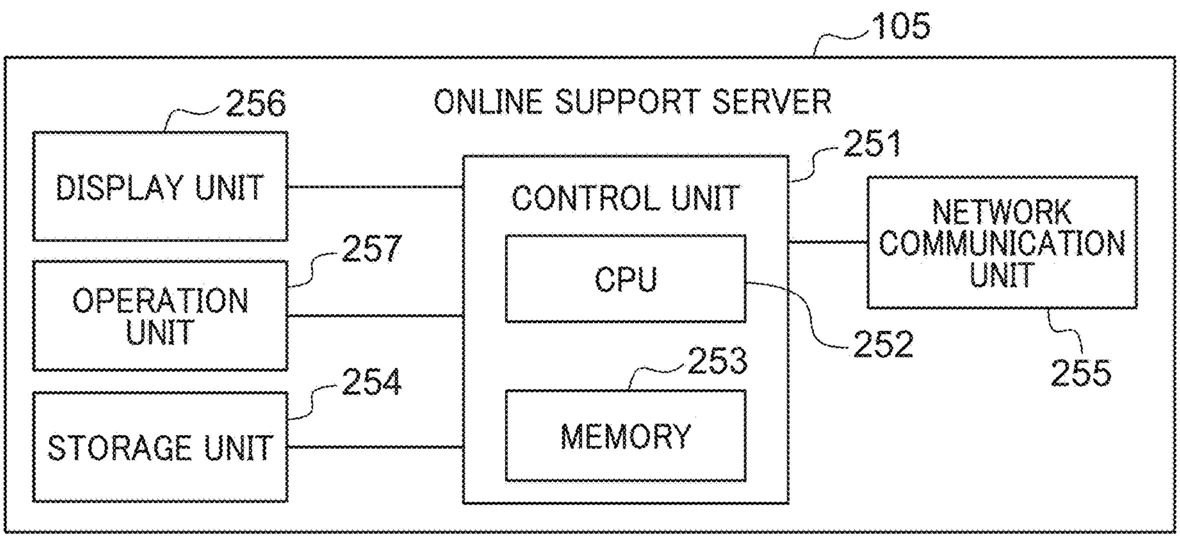

FIG. 2E is a configuration diagram illustrating the online support server 105. Although in the description of the present embodiment, it is assumed that the online support server 105 is comprised of one information processing apparatus, the online support server 105 may be comprised of a plurality of information processing apparatuses. The online support server 105 includes a display unit 256, an operation unit 257, a storage unit 254, a control unit 251, and a network communication unit 255. The display unit 256 and the operation unit 257 are the same as the display unit 216 and the operation unit 217 of the client terminal 101, and hence description thereof is omitted.

The storage unit 254 is a nonvolatile and rewritable memory device, such as an HDD, an SSD, or a flash memory. An extension setup information file, in which information for extending the functions provided by the client terminal 101, is stored in the storage unit 254.

The storage unit 254 stores programs for various services provided by the online support service unit 351. The programs are loaded onto a memory 253 of the online support server 105, and the loaded programs are executed by a CPU 252 to implement the online support service unit 351. The control unit 251 includes the CPU 252 and a memory 253. The CPU 252 is configured to control the overall operation of the online support server 105. The memory 253 stores various data and others generated by the CPU 252 executing programs.

The network communication unit 255 is an interface for the online support server 105 to communicate with the client terminal 101. The online support server 105 is configured to receive a request to obtain a file stored in the storage unit 254 via the network communication unit 255, read the file from the storage 254, and send the file to the client terminal 101.

Figure 3A:
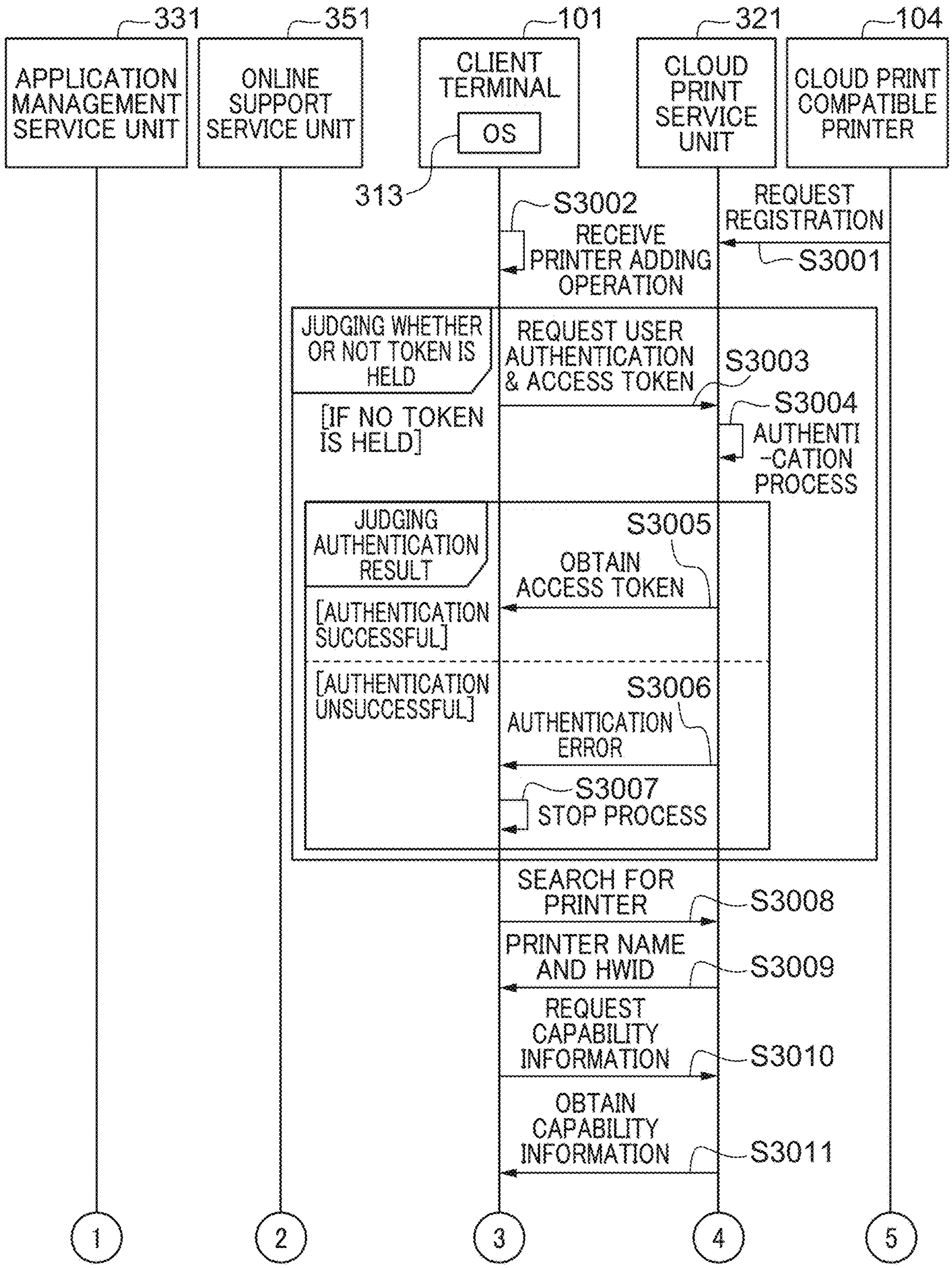
FIGS. 3A and 3B are sequence diagrams illustrating an example of a process of installing a print setting extension application.
Figure 3B:
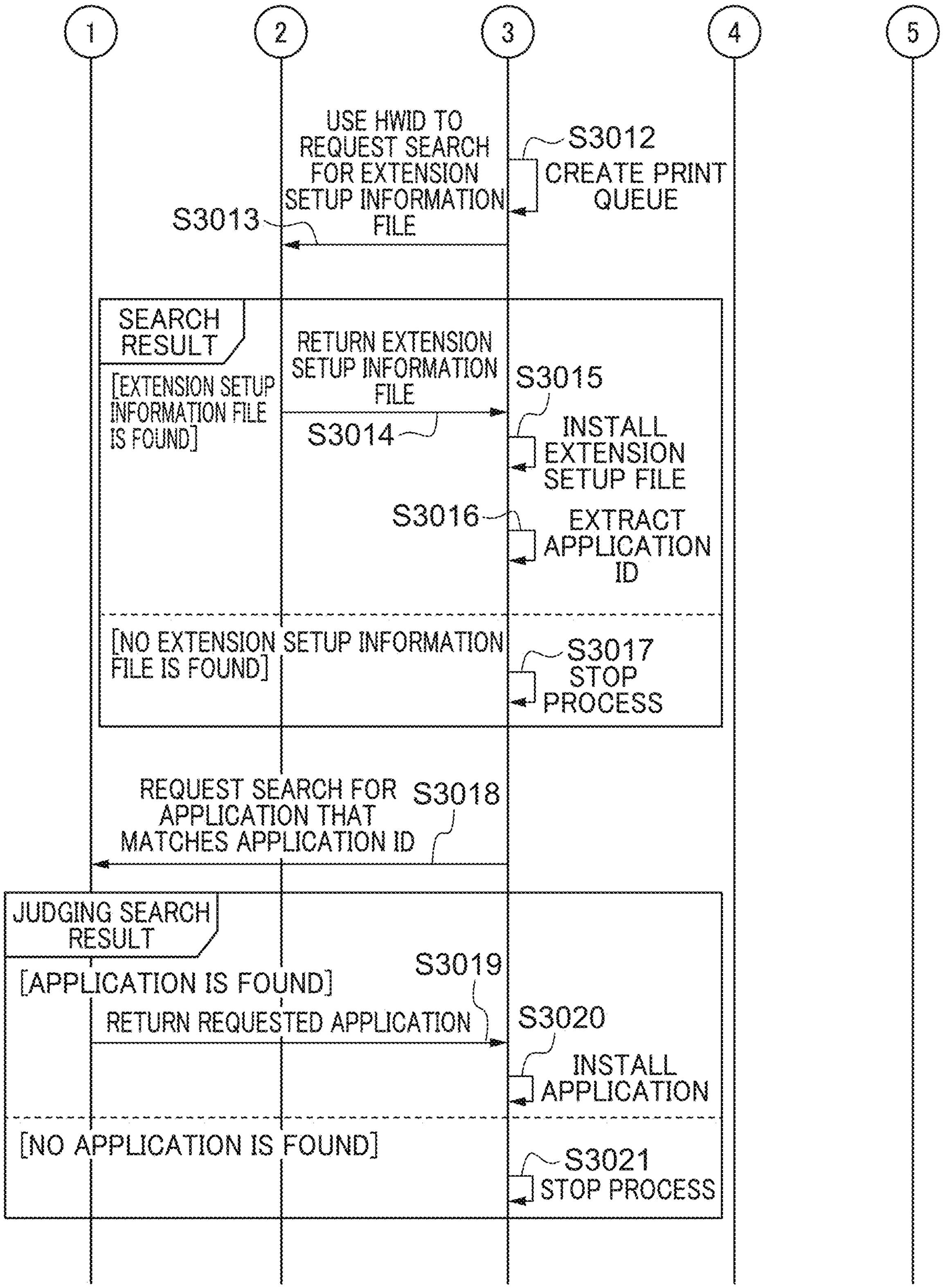

Next, referring to FIGS. 3A and 3B, a description will be given of a process in which the print setting extension application 312 is installed in the client terminal 101. First, the cloud print compatible printer 104 receives from a user a printer registration operation for registering the cloud print compatible printer 104 in the cloud print service unit 321. The cloud print service unit 321 is configured to manage information on the cloud print compatible printer 104 and provide a service that responds to various requests from the client terminal 101.

In S3001, the cloud print compatible printer 104 sends, to the cloud print service unit 321, device identification information on itself and a printer registration request. Here, examples of the device identification information sent to the cloud print service unit 321 include an HWID (hardware ID) assigned to each printer model. It should be noted that the device identification information may be any type of information as long as it can identify a printer model.

Upon receiving the registration request, the cloud print service unit 321 sends, to the cloud print compatible printer 104, a URL of the cloud print service unit 321 for printer registration. When a user accesses the URL via the cloud print compatible printer 104 or the client terminal 101, an input form for a user ID and a password are displayed on a display unit of the device that has accessed the URL. By inputting a user ID and a password for using the cloud print service unit 321, the user logs in to the cloud print service unit 321. When the user successfully logs in to the cloud print service unit 321, the cloud print service unit sends, to the cloud print compatible printer 104, an obtaining request to obtain information used for printer registration. Upon receiving the obtaining request, the cloud print compatible printer 104 sends printer information to the cloud print service unit 321.

Next, the cloud print service unit 321 that has received the registration request registers information on the cloud print compatible printer 104 and creates a print queue for the cloud print compatible printer 104. On this occasion, the cloud print service unit 321 obtains capability information on the cloud print compatible printer 104 and associates the capability information with the created print queue. Here, the capability information means information indicating functions which a printer is equipped with. For example, the capability information is print setting information used by users to configure print settings at the time of printing, and includes double-sided printing availability information, color printing availability information, stapling availability information, and formats of image data that can be processed by a printer.

FIG. 5 illustrates an example of the capability information. In the present embodiment, the cloud print service unit 321 uses IPP as a communication protocol for communicating the capability information, to obtain item names, attribute values, and default values as illustrated in FIG. 5 from the cloud print compatible printer 104. The item names correspond to setting items in print setting information, the attribute values correspond to options and/or settable value range for setting items, and the default values correspond to initial values of the settings. The item names and the attribute values stored in the cloud print compatible printer 104 include item names and attribute values defined as industry standard specifications by IPP and item names and attribute values defined by a printer vender on its own. Example of the item names and attribute values defined by a printer vendor on its own include “job name abbreviation” and “staple-free stapling”, which are item names not illustrated in FIG. 5, and attribute values associated with them.

The vender’s own item names in the present embodiment include PDF pass-through setting 501. The PDF pass-through setting 501 is used for defining whether or not to use a function of printing an application-generated PDF file without converting it to XPS format (function of PDF pass-through printing) when printing is performed via a standard driver (ON: PDF pass-through printing is enabled, OFF: PDF pass-through printing is disabled). In printing with the PDF pass-through setting 501 disabled (OFF), an application calls an API (Application Programming Interface) prepared in the OS 313. The OS 313 then converts a PDF file to be printed to XPS format and then reconverts it to PDF format.

Figure 12:
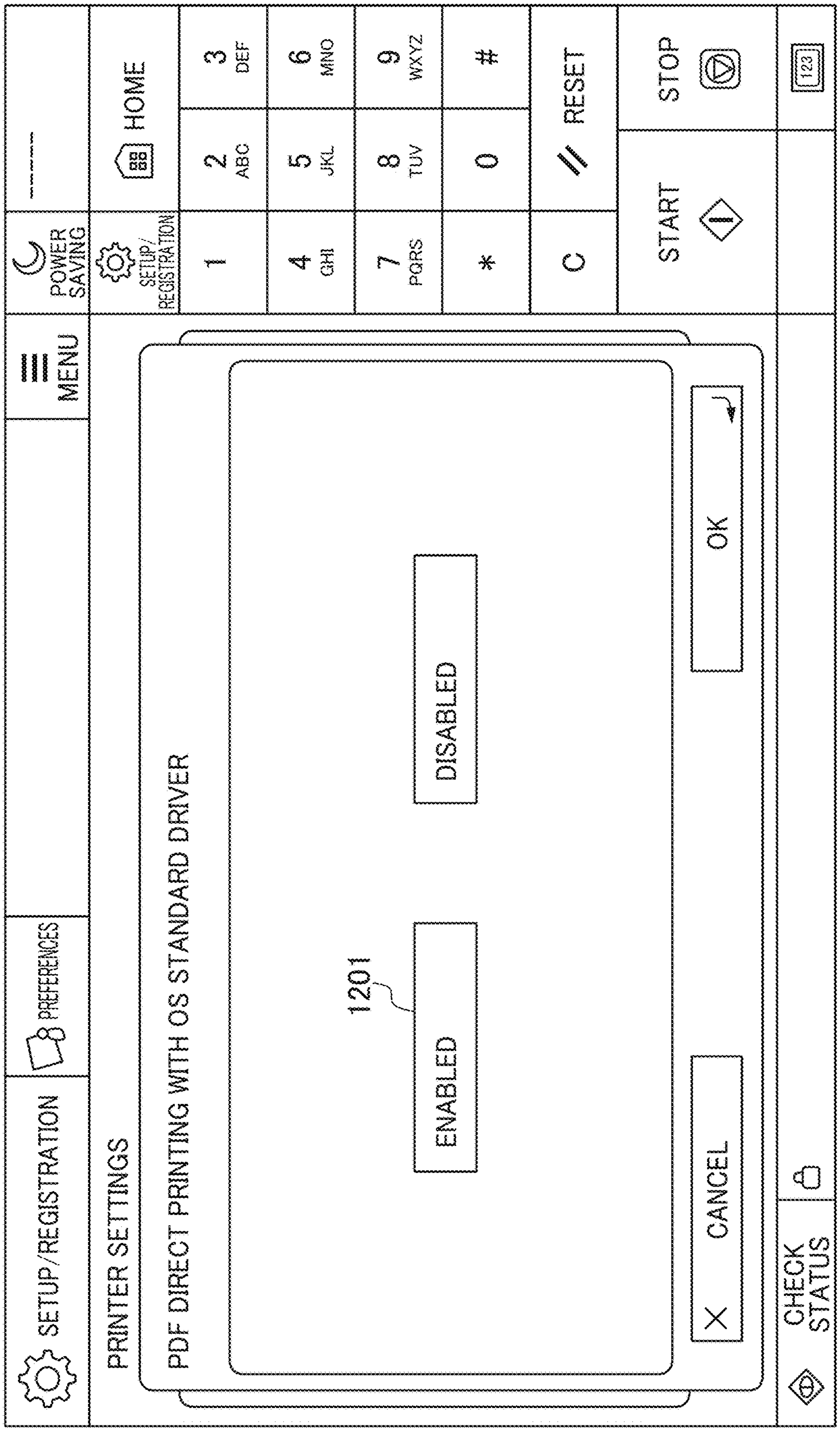
FIG. 12 is a diagram illustrating an example of a PDF pass-through setting screen displayed on a cloud print compatible printer.

FIG. 12 is a diagram illustrating an example of a PDF pass-through setting screen that is displayed on the display unit 246 in the main body of the cloud print compatible printer 104. On the PDF pass-through setting screen displayed on the display unit 246, a user can configure the PDF pass-through setting 501 before printing is performed. In response to the depression of a setting change button 1201 (see FIG. 12) by a user, the cloud print compatible printer 104 registers a setting value chosen for the PDF pass-through setting 501 as the default value for the pass-through printing setting 501. The client terminal 101 is notified of the registered information on the PDF pass-through setting 501.

It should be noted that although in the present embodiment, it is assumed that print settings are configured through the setting screen displayed on the main body of the cloud print compatible printer 104, print settings may be configured on, for example, the client terminal 101 via the network 107 without performing operations on the main body of the cloud print compatible printer 104. It should be noted that a printer vender's own attribute value may be defined for an item name defined by industry standard specifications. Moreover, the capability information is information indicating functions which a printer is equipped with irrespective of whether or not item names and attribute values of the capability information are defined by IPP.

A description will now be given of how the print setting extension application 312 is installed when a user performs on the client terminal 101 a setup operation for printing a file to be printed with the cloud print compatible printer 104. In S3002, the OS 313 (see FIG. 3A) of the client terminal 101 receives a printer-adding operation, which is a setup operation for the cloud print compatible printer 104 by a user (receipt of a printer-adding operation). The OS 313 is an OS (Operating System) that manages the operation of the client terminal 101. An example of the setup operation for the cloud print compatible printer 104 will be described below.

Figure 4:
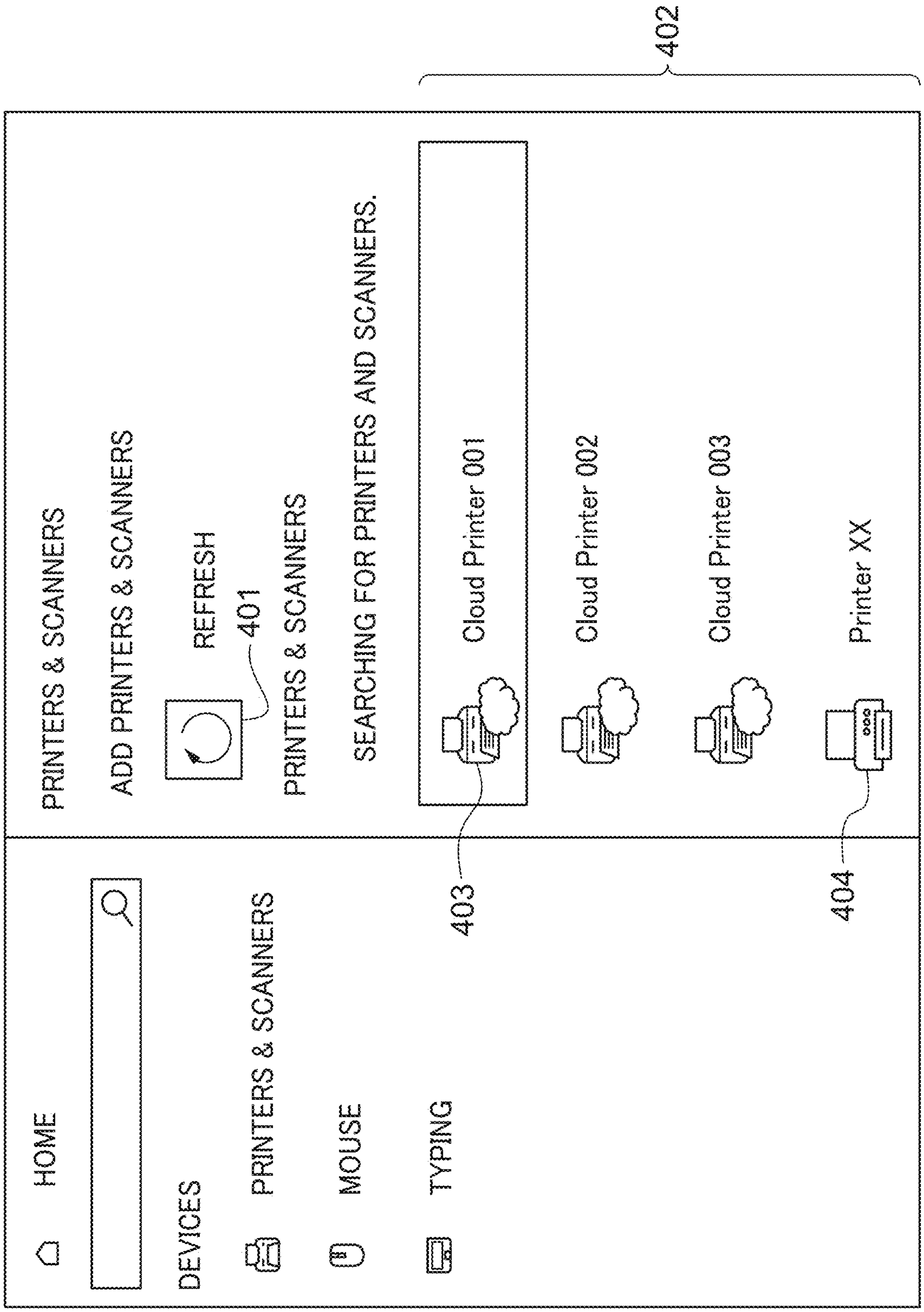
FIG. 4 is a diagram illustrating an example of a printer management screen displayed on the client terminal.

FIG. 4 illustrates a printer management screen for printers registered in the client terminal 101, and it is displayed by the OS 313 of the client terminal 101. The printer management screen in FIG. 4 includes a display area 402 where objects for printers including Cloud Printer 001 and Printer XX designated by reference numerals 403 and 404 are indicated as a search result. When a user selects an object 401, a printer adding instruction is input to the OS 313. The OS 313 that has received the instruction to add the cloud print compatible printer 104 judges whether or not the OS 313 holds an access token for the cloud print service unit 321.

If the OS 313 does not hold the access token, the OS 313 causes the display unit 216 (see FIG. 2A) to display a screen for inputting user information (a login name and a password). Next, in S3003, the OS 313 sends, to the cloud print service unit 321, user information input via the screen and requests user authentication and an access token.

Then, in S3004, the cloud print service unit 321 carries out an authentication process using the user information received from the client terminal 101. After completing the authentication process, the cloud print service unit 321 notifies the client terminal 101 of a result of the authentication process. Here, when the user authentication is successful, the OS 313 of the client terminal obtains the access token from the cloud print service unit 321 in S3005.

On the other hand, when the user authentication is unsuccessful in S3004, the cloud print service unit 321 notifies the OS 313 of an authentication error in S3006. Then, in S3007, the OS 313 stops the process based on the information indicating the authentication error. Failing to obtain the access token, the OS 313 ends the process illustrated in FIGS. 3A and 3B. Thus, when authentication is successful in S3004, a process in S3005 is carried out, and on the other hand, when authentication is not successful in S3004, processes in S3006 and S3007 are carried out.

In a case where the OS 313 has already held the access token or a case where the access token is obtained in S3005, the process proceeds to S3008. The OS 313 searches for printers registered in the cloud print service unit 321 and printers connected to the network 107 (S3008). In S3008, the OS 313 sends the printers a request to obtain printer information registered in the cloud print service unit 321, in order to search for the registered printers. At this time, the OS 313 sends the cloud print service unit 321 a request to obtain printer information to which the access token is attached. It should be noted that in the present embodiment, the cloud print compatible printer 104 is found as a printer registered in the cloud print service unit 321.

Then, in S3009, the cloud print service unit 321 sends the client terminal 101 the printer information on the cloud print compatible printer 104, which the user identified by the access token attached to the obtaining request is allowed to use. Here, the printer information is comprised of a printer name and an HWID (hardware ID) of the cloud print compatible printer 104 and is sent to the client terminal 101. Based on the printer information obtained from the cloud print service unit 321 and information indicating the printers detected by searching the network 107, the OS 313 causes the display unit 216 (see FIG. 2A) to display a printer list in the display area 402 (see FIG. 4). It should be noted that only objects for printers registered in the cloud print service unit 321 may be displayed in the display area 402.

After that, in S3010, a process described below is carried out. That is, when a user selects an object indicating a printer from the list in the display area 402, the OS 313 sends the cloud print service unit 321 a printer capability information request that requests capability information on the printer corresponding to the selected object. For which setting items the OS 313 requests the capability information is predetermined in accordance with the specifications of OS 313. The OS 313 uses "Get-Printer-Attribute" operation defined by IPP to send the cloud print service unit 321 the printer capability information request whose argument is item names defined by IPP, (request of capability information).

In S3011, the cloud print service unit 321 responds to the OS 313 with capability information on the cloud print compatible printer 104. It should be noted that the capability information with which the cloud print compatible printer 104 responds to the OS 313 is not limited to the capability information registered in the cloud print service unit 321 in S3001 but may include capability information registered at other times. For example, the capability information with which the cloud print compatible printer 104 responds to the OS 313 may include capability information that is registered when capability information on the cloud print compatible printer 104 is changed and/or capability information registered when the OS 313 detects the startup of an advanced print setting screen. In short, the latest capability information that has been updated can be capability information with which the cloud print compatible printer 104 responds to the OS 313.

In S3011, the cloud print service unit 321 responds to the OS 313 with attribute values and a default value corresponding to each setting item designated by the client terminal 101. Here, the cloud print service unit 321 responds to the OS 313 with all the attribute values registered in the cloud print service unit 321. It should be noted that in a case where a response for attribute values requested by the OS 313 is not stored in the cloud print service unit 321, the cloud print service unit 321 does not respond to the OS 313.

The OS 313 then starts installing the cloud printer driver 311 based on device identification information on the printer selected by the user and its printer name. After that, in S3012, the OS 313 creates a print queue for the cloud printer driver 311 having basic device capability information bundled with the OS 313. Here, the device capability information is definition information used to generate print setting capability information on a printer driver, and is described for example in XML, like "PrintDeviceCapabilities".

FIG. 6A is a diagram illustrating an example of the initial device capability information bundled with the OS 313. For example, information piece 601 about "PageMediaSize" includes information about paper size, in which the word "Feature" indicates that "PageMediaSize" is a setting item about sheet size, and the words "Option" indicate options for "PageMediaSize". The information piece 601 includes only two options of paper size, "A4" and "LETTER", which are the initial values of the device capability information. This information is stored in association with the print queue and is managed by the OS 313. It should be noted that the initial device capability information is fixed irrespective of information on the connected printer. The OS 313 then uses the capability information obtained from the cloud print service unit 321 to update the device capability information constituting the cloud printer driver 311.

FIG. 6B is a diagram illustrating an example of the device capability information updated with the capability information obtained from the cloud print service unit 321. For example, information piece 602 about "PageMediaSize" includes options of paper size other than "A4" and "Letter", which have been added as sheet sizes printable by the cloud print compatible printer 104.

In such a manner, the client terminal 101 (OS 313) registers the cloud printer driver 311 and the device capability information bundled with the OS 313 in the print queue in association with each other, and then updates the device capability information associated with the print queue with the capability information obtained from the cloud print service 321. At this time, the OS 313 updates the device capability information to extend setting values, by using only the attribute values defined by the industry standard specifications among the capability information obtained from the cloud print service unit 321. Even if vender's own attribute values are obtained in the process of obtaining the capability information, the vender's own attribute values are not added to the device capability information. The installation of the cloud printer driver 311 is thus completed.

FIG. 17 illustrates information that indicates a format of image data based on which the cloud print compatible printer 104 is capable of performing printing, where the information is added to the device capability information illustrated as an example in FIG. 6B. In FIG. 17, the word "ABC XPS to PDF" 1701 designates capability information indicating that the cloud print compatible printer 104 is capable of receiving and printing PDF files. Likewise, if the cloud print compatible printer 104 is capable of receiving and printing PWG-Raster format files, capability information indicating this capability is added to the device capability information illustrated as an example in FIG. 6B. At the start of configuration of print setting, by reading the device capability information illustrated in FIG. 6B received from a printer, the cloud printer driver 311 can configure print settings to perform printing in an image format corresponding to the capability information on the printer.

The OS 313 then starts installing an application (print setting extension application) that is in association with the printer and extends the functionality of a cloud printer driver. First, the OS 313 adds or attaches additional identification information to device identification information. This addition process is carried out for obtaining an extension setup information file 700 from the online support service unit 351, and the additional identification information should be a character string different from normal device identification information. In the present embodiment, the OS 313 adds additional identification information ("PrinterApp_"), which indicates an application for printers, to the device identification information so that the application can be distinguished from applications for other devices.

It should be noted that "PrinterApp_" is just an example of the additional identification information and the additional identification information may be another character string, number, symbol, or the like. If device identification information on the cloud print compatible printer 104 is, for example, "device001", the resulting device identification information after the addition process is "PrinterApp_device001".

Then, in S3013, the OS 313 sends, to the online support service unit 351, a request to search for the extension setup information file 700 including intended device identification information with additional identification information. That is, the OS 313 requests the online support service unit 351 to search for the extension setup information file 700 using an HWID. At this time, the online support service unit 351 is notified of "PrinterApp_device001" obtained by adding the additional identification information to the device identification information as described above.

FIG. 7 is a diagram illustrating an example of the extension setup information file 700, which is stored in the online support service unit 351 to be searched. In the extension setup information file 700, an application identifier is described, where the application identifier identifies a print setting extension application for use in configuration of print data which will be sent to the cloud print compatible printer 104. In the extension setup information file 700 illustrated in FIG. 7, an item 701 of "PackageFamilyName" is relevant to identification information for the print setting extension application, and "PrinterApp_aaaaaaaaaaa8a!App" is described as the application identifier. Further, for the item of "PrinterHardwareId", "PrinterApp_device001", which is the character string obtained by adding the additional identification information to the identification information on the cloud print compatible printer 104 is described.

Further, extension setup information including identification information on a printer driver is described is also stored in the online support service unit 351 (the storage unit 254 in FIG. 2E). In the extension setup information file 700 including a printer driver identifier, the printer driver identifier is described for an item of "PackageFamilyName". Also in the extension setup information file 700, device identification information to which additional identification information is not added is described for an item of "PrinterHardwareId". For this reason, the OS 313 adds additional identification information to the device identification information in order to obtain the intended extension setup information file 700 from the online support service unit 351.

As a result of the search for the extension setup information file 700, in a case where the extension setup information file 700 including the intended device identification information is stored in the online support service unit 351 (the storage unit 254), the online support service unit 351 carries out a process described below in S3014. That is, the online support service unit 351 returns the extension setup information file 700 to the OS 313. The contents of the returned extension setup information file 700 are written into a registry of the OS 313.

Then, in S3015, the OS 313 installs the extension setup information described in the extension setup information file 700, which has been obtained from the online support service unit 351, in association with the print queue created in S3012. After that, in S3016, the OS 313 extracts, from the installed extension setup information, an application ID specified for the item of "PackageFamilyName".

As a result of the search, in a case where the online support service unit 351 fails to detect the extension setup information file 700 including the intended device identification information, the OS 313 stops the application installation process in S3017. In a case where the OS 313 does not receive the extension setup information file 700 within a predetermined period of time after the search request or a case where the OS 313 receives an error notification from the online support service unit 351, the OS 313 stops the process in S3017. Accordingly, when the extension setup information file 700 is found as a result of the search, the OS 313 extracts the application ID from the extension setup information file 700. On the other hand, when the extension setup information file 700 is not found as a result of the search, the OS 313 stops the process.

As described above, when the OS 313 successfully obtains the extension setup information file 700, the processes in S3014, S3015, and S3016 are carried out. On the other hand, when the OS 313 fails to obtain the extension setup information file 700, the process is stopped in S3017.

A description will now be given of a process carried out when the search is successful. In S3018, the OS 313 requests the application management service unit 331 to search for an application that matches the extracted application ID. The application management service unit 331 is configured to provide services running on the application management server 103 and distribute applications stored or held in its own storage unit 234. In S3019, the application management service unit 331 that has been requested to perform the search carries out a process described below in a case where it holds a print setting extension application matching the application ID. That is, the application management service unit 331 returns the print setting extension application 312 matching the application ID to the client terminal 101.

In S3020, the OS 313 installs the obtained print setting extension application 312 in association with the client-side print queue. On this occasion, the OS 313 stores the application ID as information for the print queue in the registry. The print setting extension application 312 makes setting for the OS 313 such that the OS 313 outputs an event notification at the time when the print queue associated with the print setting extension application 312 is set on the print setting screen. After the startup of the OS 313, the installed print setting extension application 312 is started and runs as a background task.

On the other hand, as a result of the search, in a case where the application management service unit 331 stores or holds no print setting extension application matching the intended application ID, the OS 313 stops the application installation process in S3021. On this occasion, the created print queue and the cloud print driver 311 are associated with each other, whereas the print setting extension application 312 is not associated with the print queue, followed by the application installation process being ended. It should be noted that the extension setup information file 700 may be searched for without carrying out the process of adding a predetermined character string to device identification information as long as a file for printer driver installation is distinguishable.

As described above, in the case where the application management service unit 331 stores or holds the print setting extension application 321 matching the intended application ID, the OS 313 installs the print setting extension application 321 in association with a client-side print queue. Otherwise, the OS 313 stops the application installation process.

Figure 8A:
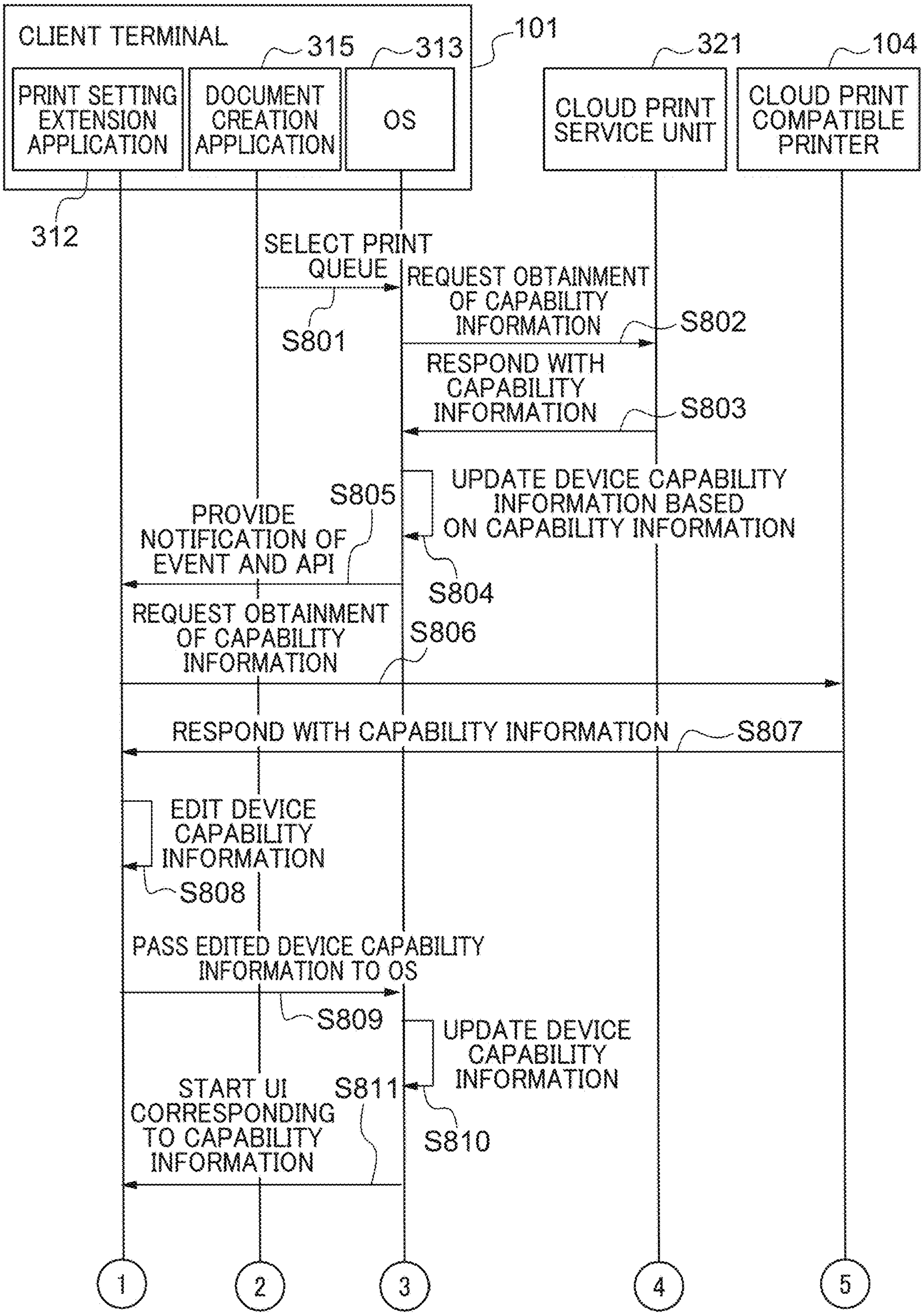
FIGS. 8A and 8B are sequence diagrams illustrating an example of processes from configuring print settings through the print setting extension application to sending print data to a printer.
Figure 8B:
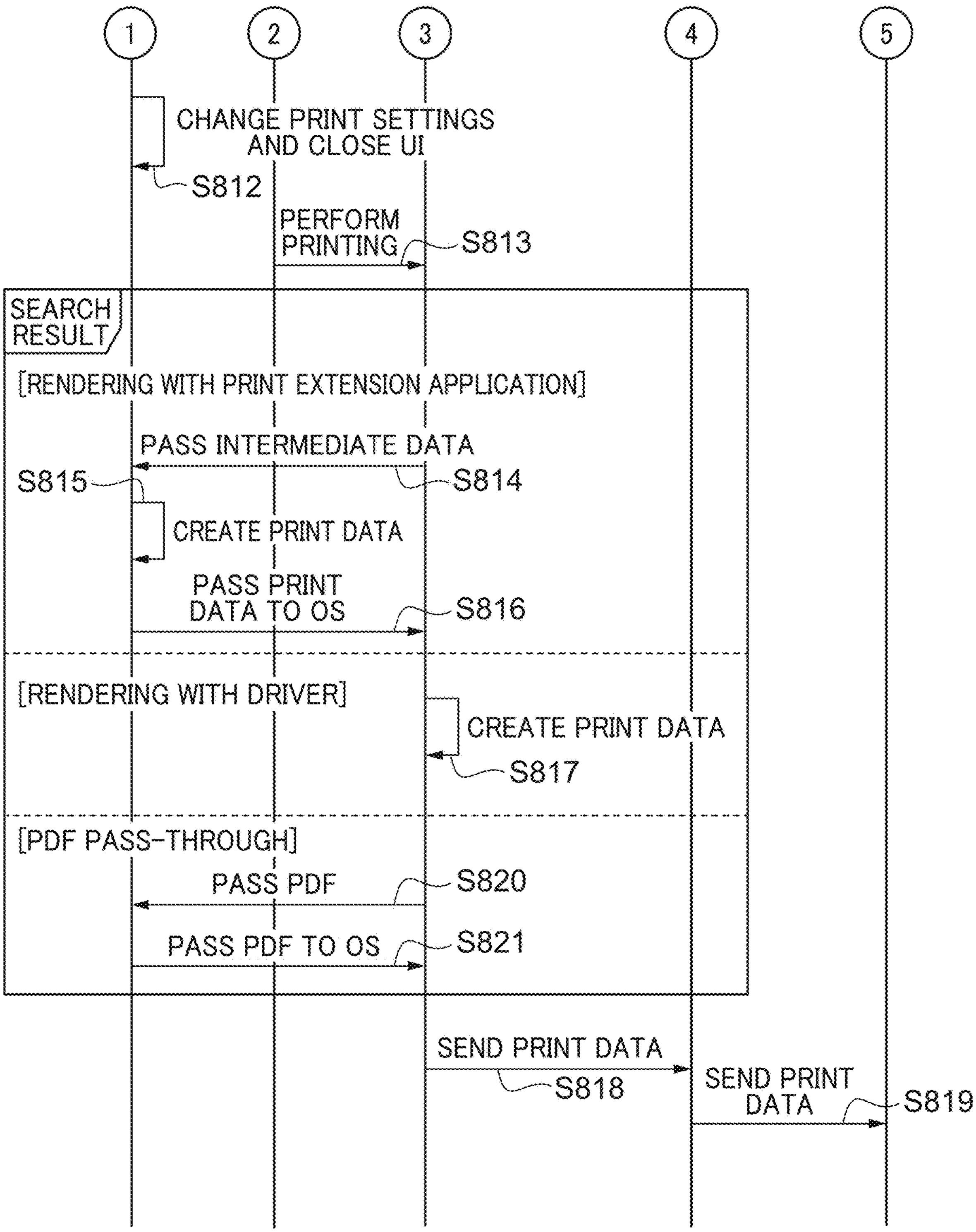

Referring to FIGS. 8A and 8B, a description will now be given of processes from configuring print settings through the print setting extension application 312 to sending print data to the cloud print compatible printer 104.

A document creation application 315 on the client terminal 101 causes the display unit 216 to display an initial print setting screen (see FIG. 11) for selecting a print queue. It should be noted that the document creation application 315 is an application for creating document files, examples of which include a document data creation application, a presentation material creation application, and a photo/image data viewing application.

Figure 11:
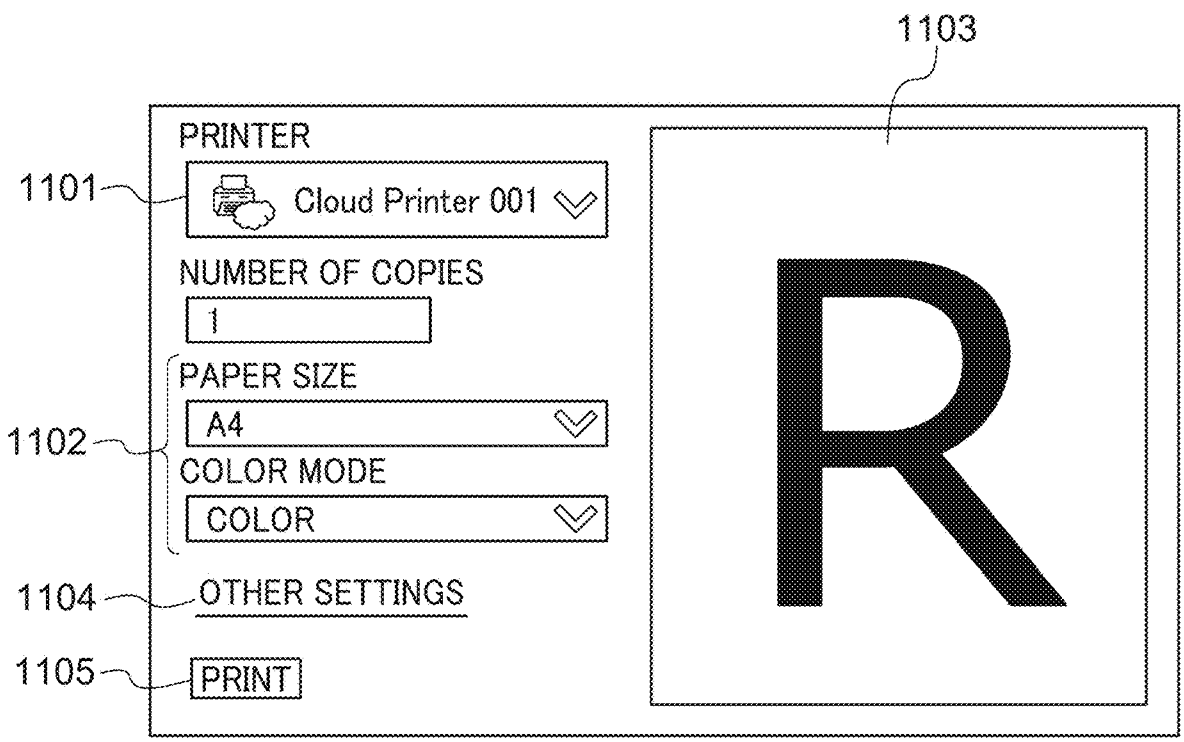
FIG. 11 is a diagram illustrating an example of an initial print setting screen displayed by a document creation application.

In the present embodiment, the document creation application 315 causes the display unit 216 to display the initial print setting screen. Alternatively, the OS 313 may cause the display unit 216 to display the same. As illustrated in FIG. 11, the initial print setting screen includes an object 1101 for selecting a printer, objects 1102 for configuring print settings, and a print preview 1103. The initial print setting screen also includes an object 1104 for other settings and a print button 1105.

First, in S801, the OS 313 detects that a printer to be used is selected by a user via the object 1101 and then selects a corresponding print queue. Specifically, the document creation application 315 sends print queue selection information to the OS 313. In the following description, it is assumed that a printer queue for a default printer is selected at the time when the display of the initial print setting screen is started.

Next, in S802, the OS 313 sends, to the cloud print service unit 321, a capability information request for obtaining capability information on the printer. The OS 313 designates the printer name selected with the object 1101 in the initial print setting screen and sends the capability information request to the cloud print service unit 321. For which setting items the OS 313 requests the capability information depends on the specifications of the OS 313, and therefore, the capability information obtained by the OS 313 at this time is the same as the one obtained in S3011 in FIG. 3A.

A standard protocol defined by IPP, such as "Get-Printer-Attributes", is used for making the request for the capability information to the cloud print service unit 321 in which the cloud print compatible printer 104 is registered. In the case where the "Get-Printer-Attributes" operation is used, the OS 313 queries the cloud print service unit 321 for a list of items of the capability information determined by the OS 313.

Then, in S803, the cloud print service unit 321 refers to the capability information list sent by the "Get-Printer-Attributes" operation and responds to the OS 313 with requested capability information on the cloud print compatible printer 104. In a case where attribute values for media size are specified by the "Get-Printer-Attributes" operation (IPP), the cloud print service unit 321, if it holds attribute values for media size, responds to the OS 313 with values ("A4", "B5", "Letter", etc.) for the attribute values. On the other hand, if the attribute values specified by the "Get-Printer-Attributes" operation are not present in the queue for the cloud print compatible printer 104, the cloud print service unit 321 does not respond to the OS 313 with values for the attribute values.

After that, in S804, the OS 313 updates the device capability information based on the capability information obtained from the cloud print service unit 321. The OS 313 updates the device capability information by adding the capability information obtained in S803 in FIG. 8A to the device capability information created in S3012 in FIG. 3B. By the updating process carried out in S804, the device capability information managed by the client terminal 101 can be updated.

Then, in S805, the OS 313 notifies the print setting extension application 312 of an event and an API which is used to edit device capability information. Upon receiving the event notification, the print setting extension application 312 sends a capability information request for obtaining capability information to the cloud print service unit 321. The obtainment of the capability information here is intended to write setting items and attribute values defined by the printer vendor on its own into the device capability information.

Upon receiving an event for editing device capability information from the OS 313, the print setting extension application 312 inquires about capability information on the cloud print compatible printer 104 via the cloud print service unit 321 in S806. At this time, the cloud print service unit 321 inquires the cloud print service unit 321 and reads (obtains) capability information stored in the cloud print compatible printer 104, where the capability information includes the PDF pass-through setting 501 (see FIG. 5).

The print setting extension application 312 makes the inquiry using the "Get-Printer-Attributes" operation as in S802 of FIG. 8A, and specifies the item name of setting items to be queried to obtain the intended capability information. It should be noted that targeted items of the capability information to be obtained in S806 are not limited to the capability information for setting items and attribute values defined by the printer vendor on its own but may be the capability information for setting items that have already been obtained by the OS 313.

If capability information specific to the cloud print compatible printer 104 is queried by the print setting extension application 312, the cloud print compatible printer 104 responds with the capability information to the print setting extension application 312 via the cloud print service unit 321 in S807. The way of response here is the same as in S3011 in FIG. 3A described above.

In the present embodiment, the capability information which is responded to the print setting extension application 312 in S807 is capability information on the cloud print compatible printer 104 stored in the storage unit 224 (see FIG. 2B) by the cloud print service unit 321. Alternatively, the capability information which is responded to the print setting extension application 312 in S807 may be capability information obtained again from the cloud print compatible printer 104 when receiving the request for the capability information in S806. In such a manner, in S806, the client terminal 101 obtains information indicating whether PDF pass-through setting, which will be described later, is enabled or disabled in the cloud print compatible printer 104. Moreover, in the embodiment described above, the print setting extension application 312 inquires of the cloud print compatible printer 104 about capability information via the cloud print service unit 321. Alternatively, in S806, the print setting extension application 312 may inquire of the cloud print service unit 321 about capability information, and the cloud print service unit 321 may respond to this inquiry about the capability information with capability information on the cloud print compatible printer 104 registered in advance.

Upon obtaining the capability information from the cloud print compatible printer 104, the print setting extension application 312 edits in S808 the device capability information through configuration information objects which are a data set used for editing the device capability information. For example, the print setting extension application 312 converts the capability information for staple-free stapling, saddle stitch, and PDL type that can be sent to printer, obtained in S807 in FIG. 8A, to device capability information, and then adds the resulting information to the configuration information objects. In such a manner, the device capability information is edited by the print setting extension application 312. As a result of the edition, capability information for vender's own setting items and attribute values including the PDF pass-through setting 501 as well as capability information for standard setting items obtained by an inquiry from the OS 313 are added to the device capability information and stored in the storage unit 214.

Then, in S809, the print setting extension application 312 sends the edited device capability information to the OS 313. The OS 313 stores the device capability information obtained from the print setting extension application 312 in the storage unit 214 in association with the print queue. After that, in S810, when the OS 313 updates the device capability information, the object 1104 in the initial print setting screen (see FIG. 11) is activated, where the object 1104 is an object that acts as a trigger for displaying a user interface (UI) of the print setting extension application 312. It should be noted that the object 1104 is grayed out until the process in S801 is completed.

Then, in S811, when the object 1104 is selected by a user, the OS 313 starts the print setting extension application 312 to cause the display unit 216 to display a print setting screen as illustrated in FIGS. 10A to 10E. In S811, a UI corresponding to the capability information is started. As a result, the UI that reflects device settings is displayed on the display unit 216. That is, in the client terminal 101, the display unit 216 displays the print setting screen that reflects information indicating whether the file conversion is enabled or disabled, included in print setting information. The print setting screen does not depend on the type of the document creation application 315 to be used.

Figure 9A:
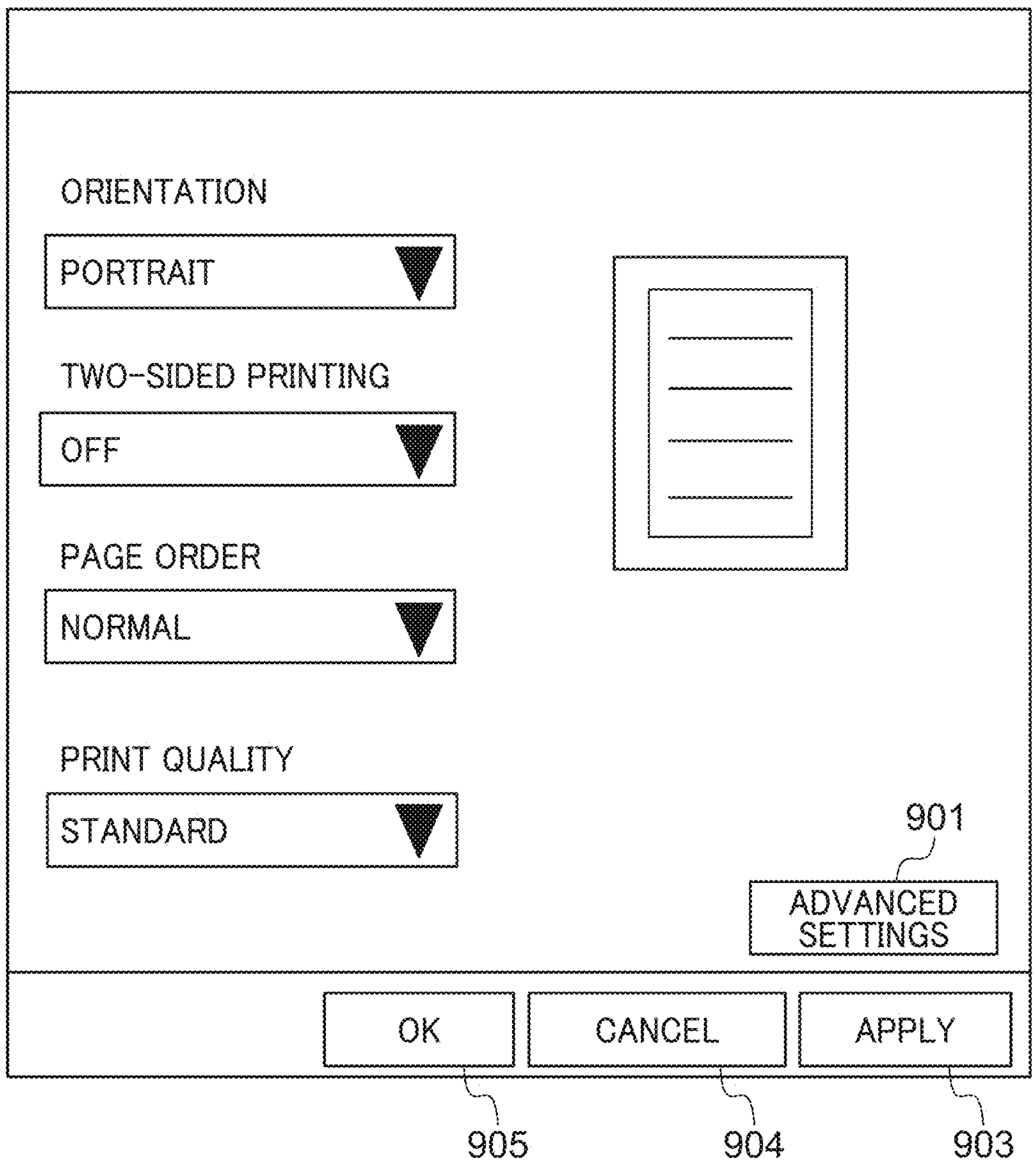
FIGS. 9A to 9D are diagrams illustrating examples of print setting screens displayed in a case where a print setting extension application is not installed.
Figure 9B:
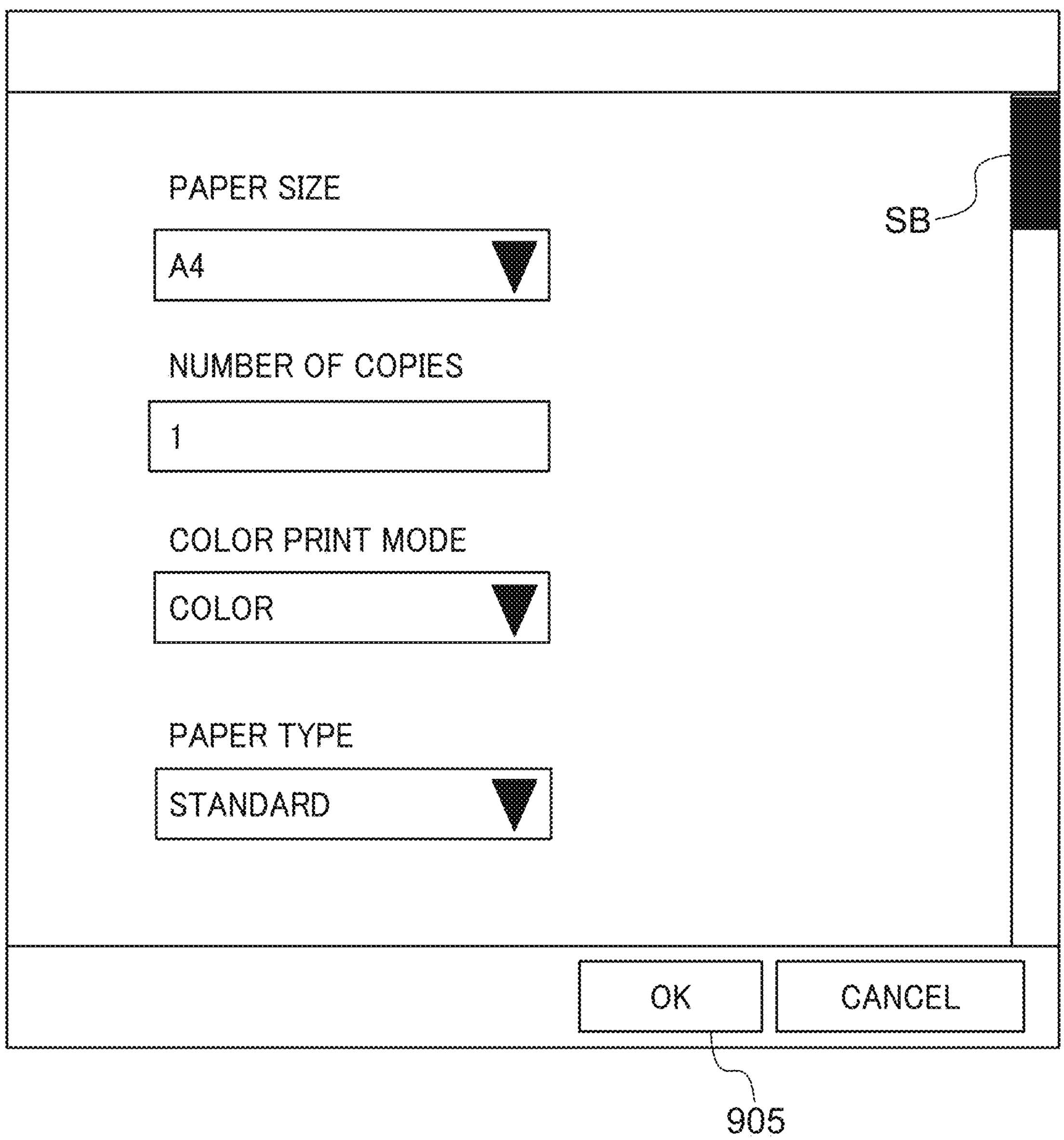
Figure 9C:
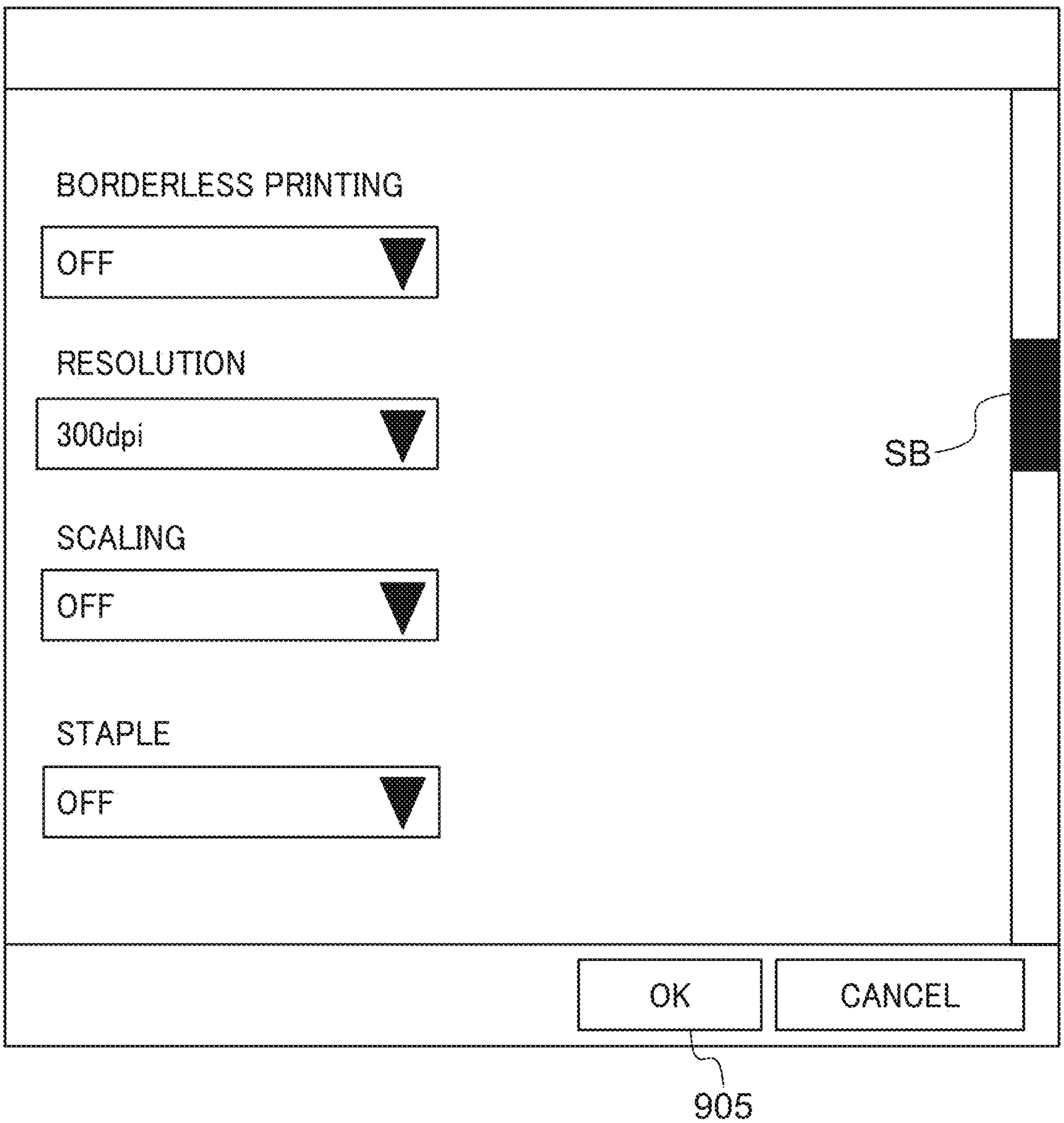
Figure 9D:
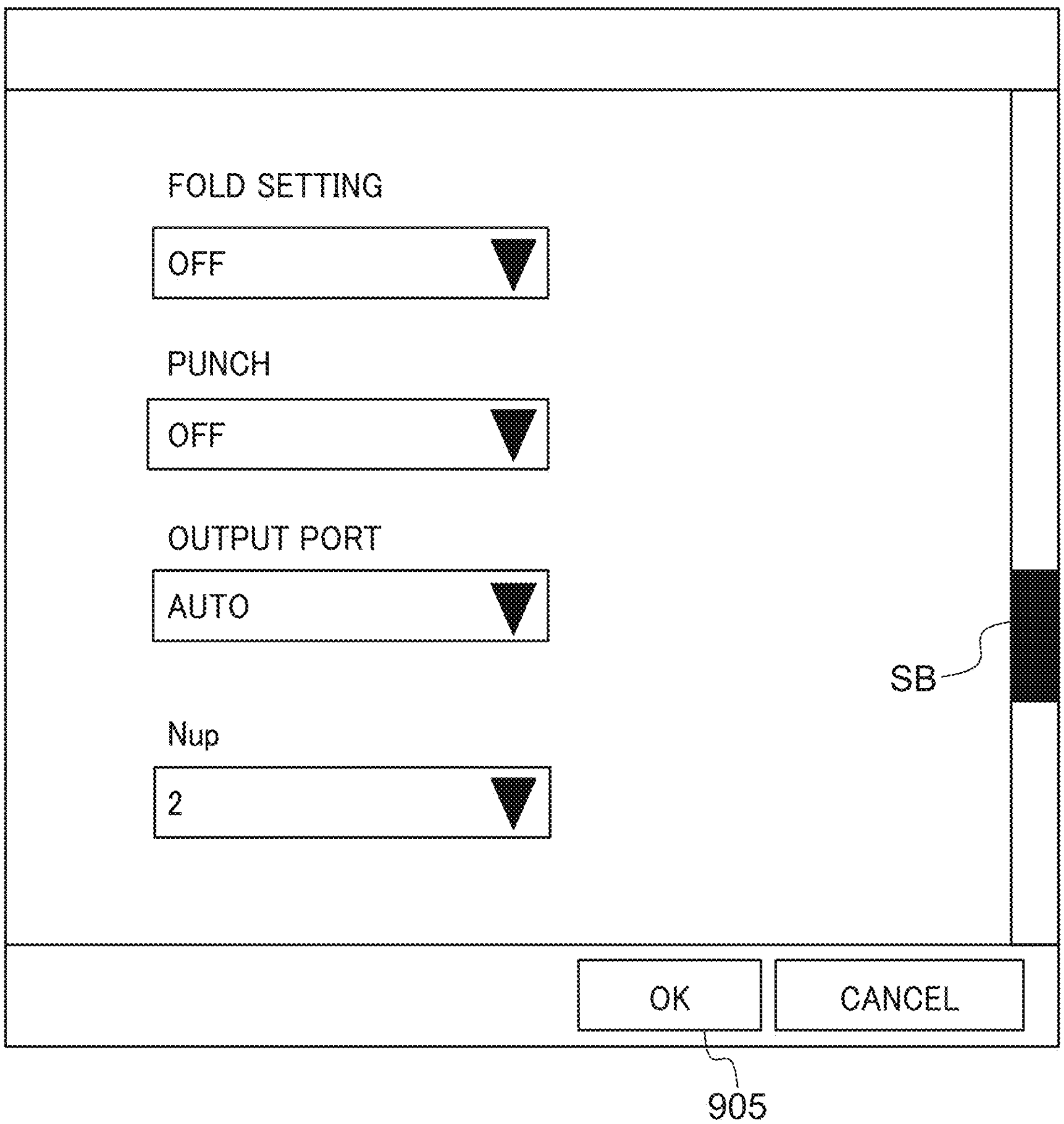

In a case where the print queue and the print setting extension application 312 are not associated with each other, the display unit 216 displays a standard print setting screen preinstalled in the OS 313 as illustrated in FIG. 9A. In response to the depression of an advanced setting button 901 in the standard print setting screen, the display unit 216 displays an advanced print setting screen in FIG. 9B, which includes setting items other than those in the standard print setting screen in FIG. 9A. The advanced print setting screen in FIG. 9B is scrollable by the vertical movement of a scroll bar (SB) and moves up and down as illustrated in FIG. 9C and FIG. 9D to indicate settings for a plurality of setting items supported by the OS 313.

In FIG. 9A, an apply button 903 is a button for saving print settings, a cancel button 904 is a button for going back to the screen in FIG. 11 without saving print settings, and an OK button 905 is a button for saving print settings and then going back to the screen in FIG. 11. It should be noted that these print setting screens preinstalled in the OS 313 do not include an object for configuring PDF pass-through setting.

The description now goes back to the print setting extension application 312. The print setting extension application 312 receives print setting information and then causes the display unit 216 to display an extended print setting screen illustrated in FIG. 10A, where the print setting information is generated based on the print setting capability information, which is generated by the OS 313 from the device capability information. The extended print setting screen is scrollable by the movement of a scroll bar (SB) as illustrated in FIGS. 10A to 10E. For example, the extended print setting screen indicates an item name "output paper size" for a setting item 1001 in FIG. 10A, which comes from print setting information generated from "psk:PageMediaSize" in the device capability information illustrated in FIG. 6B. The extended print setting screen further indicates an attribute value "A4" for the item name "output paper size", which comes from print setting information generated based on information "psk:ISOA4" by the print setting extension application 312. The print setting extension application 312 thus displays setting values (attribute values) from the device capability information on the extended print setting screen.

The print setting extension application 312 provides a function of allowing users to freely change print settings. The print setting extension application 312 is able to hold setting values for print settings, when the print settings are changed. When a user selects the OK button 1002 in the print setting screen in FIG. 10A, the print settings are confirmed. For example, assume that a user changes the output sheet size from "A4" to "Letter" on the UI. In this case, print setting information for the output sheet size held by the print setting extension application 312 is changed from "A4" to "Letter".

Figure 10A:
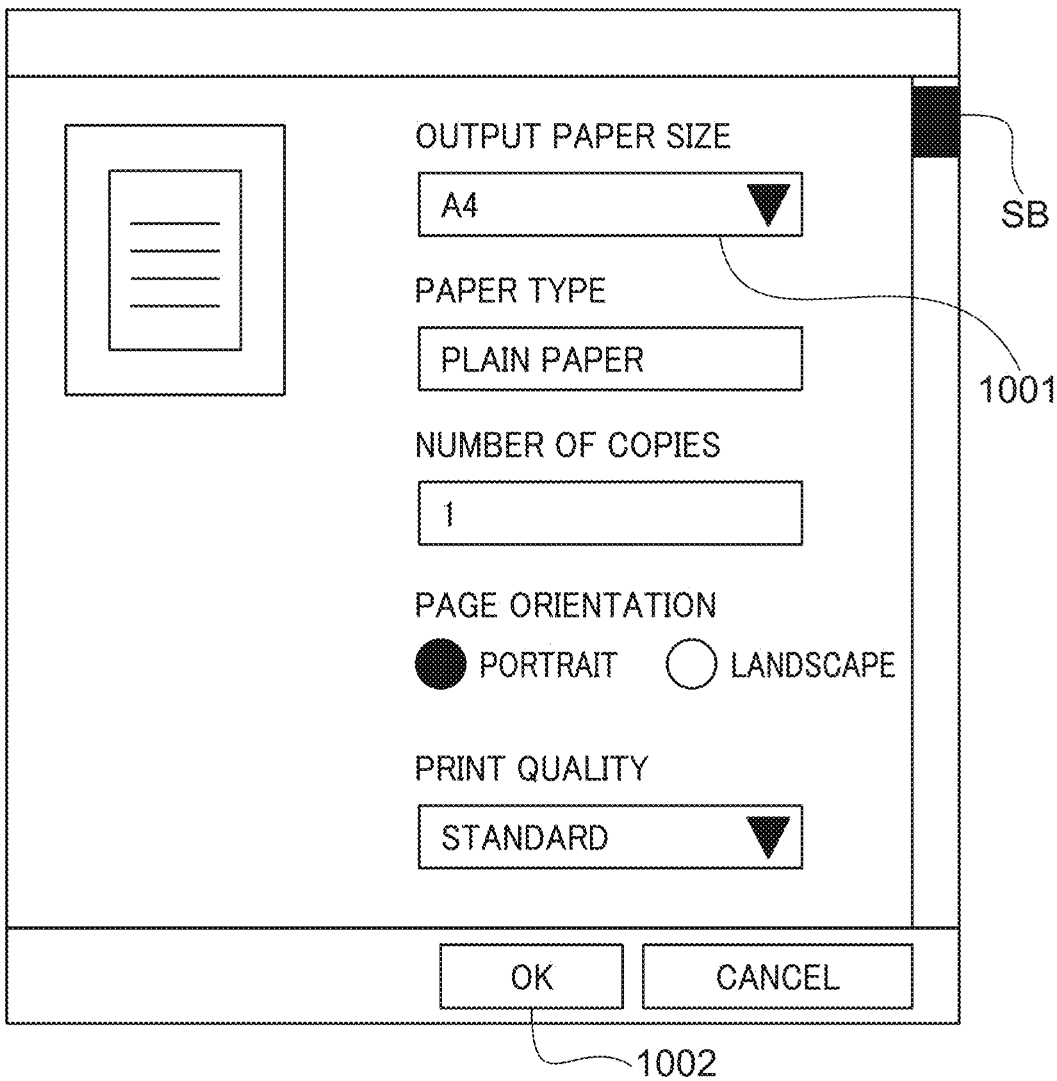
FIGS. 10A to 10E are diagrams illustrating examples of print setting screens displayed in a case where a print setting extension application is installed.
Figure 10B:
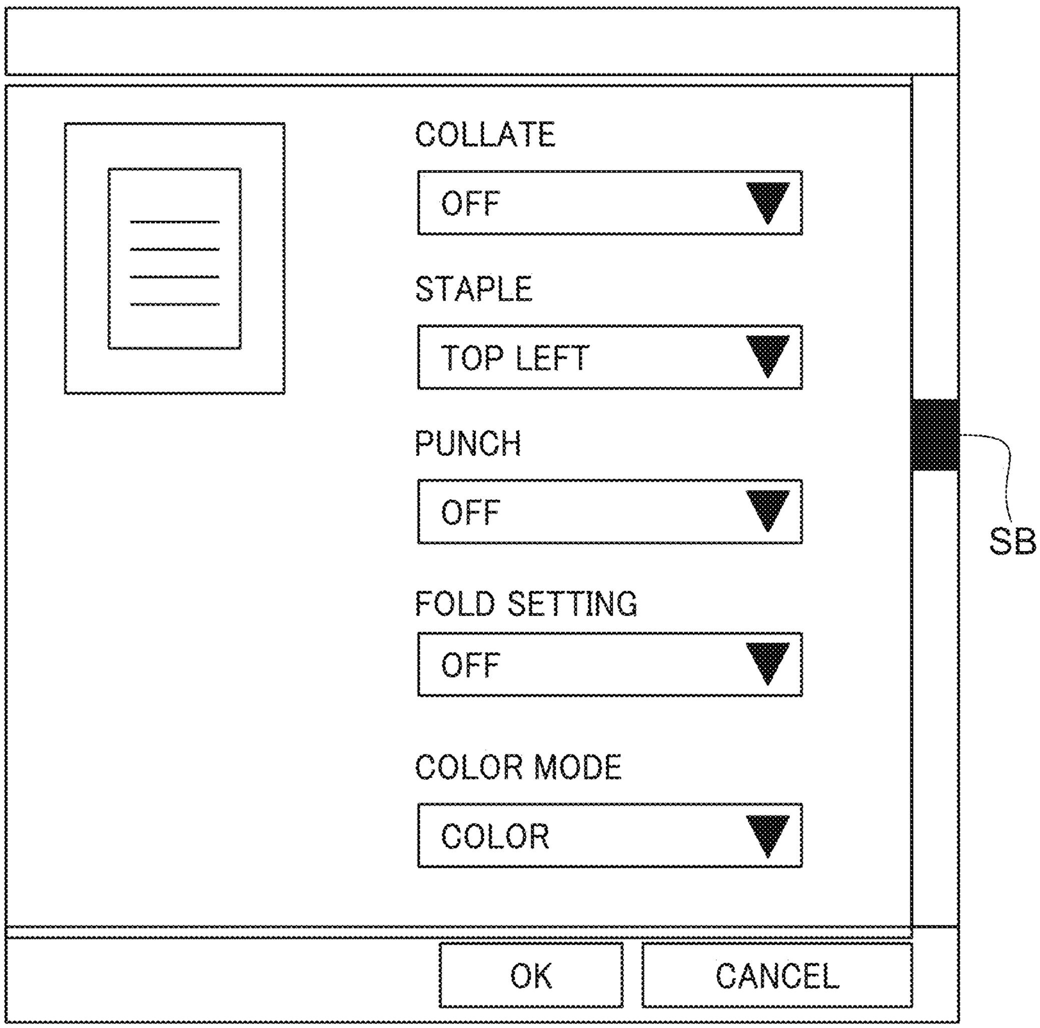
Figure 10C:
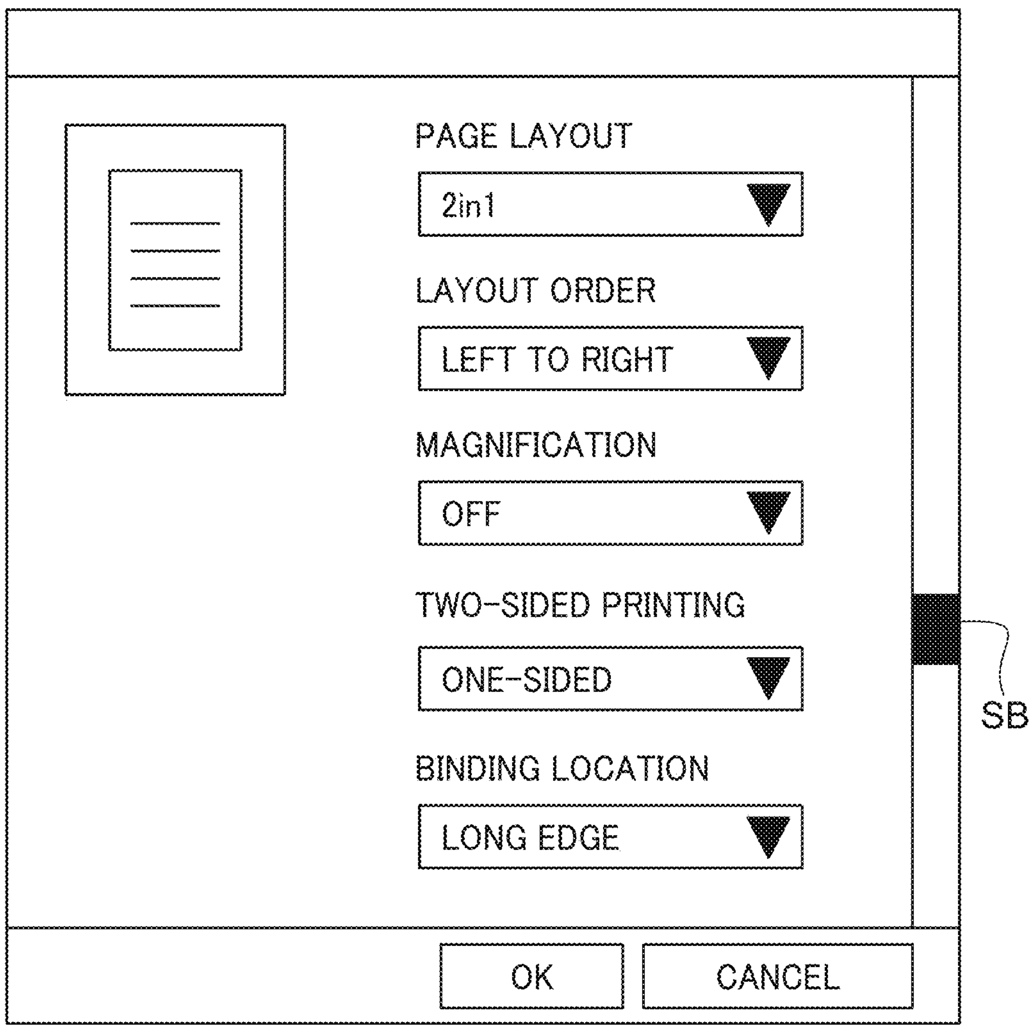
Figure 10D:
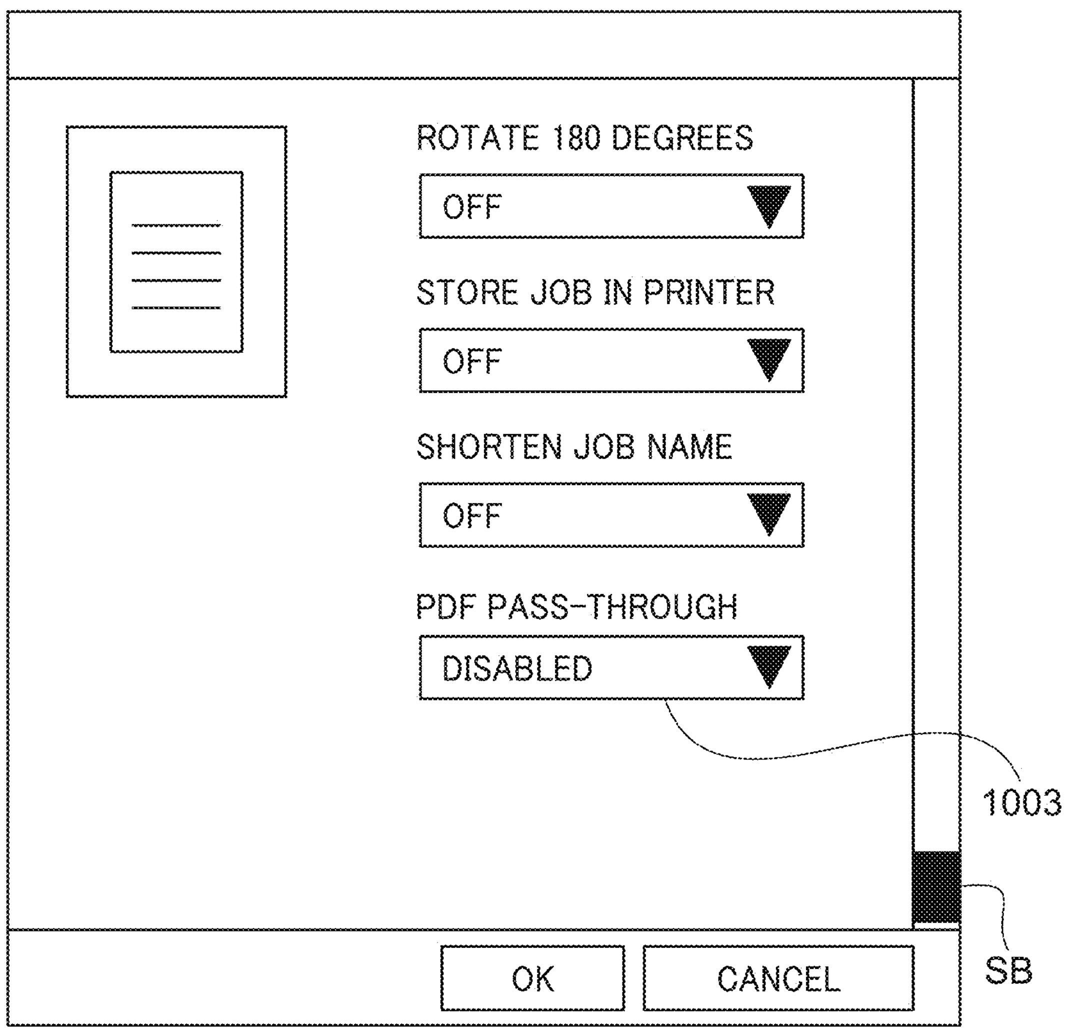
Figure 10E:
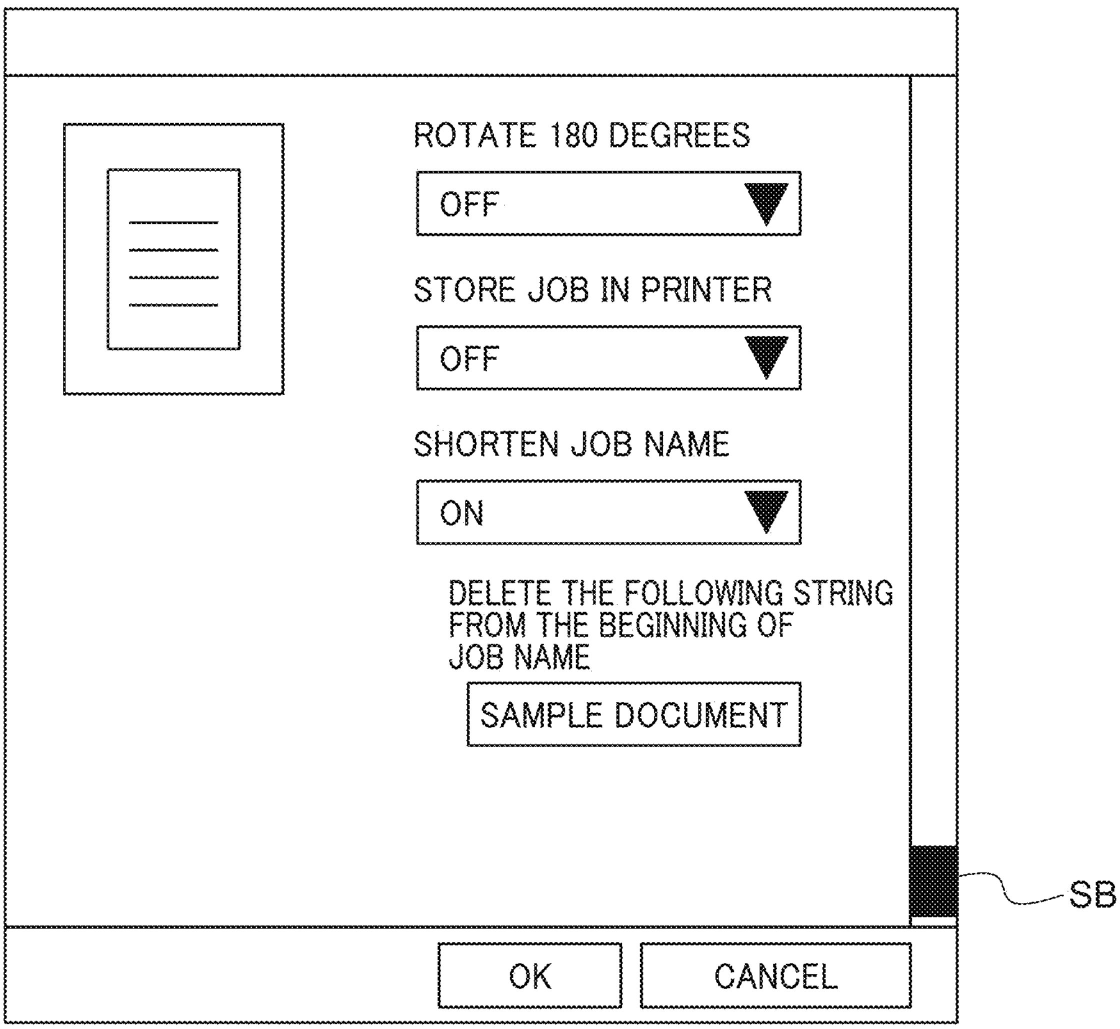

A list box 1003 in FIG. 10D is for enabling or disabling the PDF pass-through function. The list box 1003 is intended to check the capability information obtained from the cloud print compatible printer 104 by the print setting extension application 312 in S806. When the PDF pass-through setting (FIG. 5) is set to ON on the printer, the print setting extension application 312 presents to uses an extended print setting screen on which the default setting for the PDF pass-through is ON. On the other hand, when the PDF pass-through setting 501 is set to OFF on the printer, the print setting extension application 312 presents to uses an extended print setting screen on which the default setting for the PDF pass-through is OFF. When PDF pass-through is disabled (OFF), the OS 313 converts a PDF file created by the document creation application 315 to XPS format once, and the print setting extension application 312 then converts it to PDF or PWG-Raster format and sends the resulting file to the cloud print compatible printer 104.

On the other hand, when the PDF pass-through is enabled, the OS 313 directly sends a PDF file created by the document creation application 315 to the cloud print compatible printer 104 without converting it to XPS format by the OS 313. It should be noted that the standard print setting screen displayed on the display unit 216 by the OS 313, does not include the list box 1003 for enabling or disabling the PDF pass-through. In S812, when the OK button 1002 is selected by a user, the print setting extension application 312 obtains print setting information set on the print setting screen, passes the print setting information to the OS 313, and closes the extended print setting screen illustrated in FIGS. 10A to 10E. When the process in S812 is completed, the OS 313 causes the display unit 216 to display the initial print setting screen in FIG. 11, which reflects the setting values set by the print setting extension application 312.

When a user depresses the print button 1105 in the initial print setting screen in FIG. 11, a printing instruction is input to the OS 313 in S813 so that the OS 313 performs printing processing based on the input instruction. In S814, in response to the instruction to perform printing, the OS 313 creates intermediate data and sends the created intermediate data and the print setting information edited on the print setting screen to the print setting extension application 312. The intermediate data refers to data generated before conversion into print data, such as page description language (PDL) data. Examples of intermediate data include XML Paper Specification (XPS) data. The print setting information is included in this intermediate data.

Three patterns described below are assumed for the processing to be performed when a user selects the print button 1105 in the initial print setting screen in FIG. 11. The process in the first pattern is carried out in a case where the print setting extension application 312 associated with a selected print queue is installed in the client terminal 101, and the PDF pass-through function is set to be disabled. The process in the second pattern is carried out in a case where the print setting extension application 312 associated with a selected print queue is not installed in the client terminal 101. The process in the third pattern is carried out in a case where the print setting extension application 312 associated with a selected print queue is installed in the client terminal 101, and the PDF pass-through function is set to be enabled. These three patterns will be described below one by one.

A description is given of the process in the first pattern to be performed when the print setting extension application 312 associated with the selected print queue is installed in the client terminal 101, and the PDF pass-through function is set to be disabled. The OS 313 converts a file in PDF format output from the document creation application 315 to intermediate data, and then sends the intermediate data and the print setting information to the print setting extension application 312 in S814. In S815, the print setting extension application 312 receives the intermediate data and the print setting information from the OS 313 to create print data and print capability information.

The intermediate data is, for example, data in XPS format. The print data is data written in PDL, such as a PDF file. The print capability information specifically includes attribute values defined by IPP. In S816, the print setting extension application 312 sends the created print data and print capability information to the print queue in the OS 313.

A description is given of the process in the second pattern to be performed when the print setting extension application 312 associated with the selected print queue is not installed in the client terminal 101. The OS 313 of the client terminal 101 carries out a process in S817, which will be described later. That is, in S817, the OS 313 converts data output from the document creation application 315 to intermediate data, and creates print data and print capability information based on the intermediate data and the print setting information.

A description is given of the process in the third pattern to be performed when the print setting extension application 312 associated with the selected print queue is installed in the client terminal 101, and the PDF pass-through function is set to be enabled. It should be noted that the PDF pass-through function can be set to be enabled in a case where the document creation application 315 is capable of outputting PDF files.

The OS 313 receives a PDF file and print setting information from the document creation application 315. In S820, the OS 313 sends the received PDF file and print setting information to the print setting extension application 312. Then, in S821, the print setting extension application 312 creates print capability information based on the received print setting information while leaving the received PDF file as it is. The print setting extension application 312 sends the PDF file and the generated print capability information to the OS 313.

As described above, in the first pattern, the processes in S814, S815, and S816 are carried out, in which rendering is performed by the print setting extension application 312. In the second pattern, the process in S817 is carried out, in which rendering is performed by a printer driver. In the third pattern, the processes in S820 and S821 are carried out to perform PDF pass-through printing.

Next, in S818, the OS 313 sends the print data and the print capability information received from the print setting extension application 312, or the print data and the print capability information generated by the OS 313 to the cloud print service unit 321 via the print queue. After that, in S819, the cloud print service unit 321 sends the print data and the print capability information received from the client terminal 101 to the cloud print compatible printer 104.

It should be noted that the cloud print compatible printer 104 may regularly query the cloud print service unit 321 to obtain unprinted print data held in the cloud print service unit 321 and print capability information for the print data. Moreover, when a printer name is selected through the document creation application 315 in the process in S801 in FIG. 8A, the OS 313 starts obtainment of capability information and then performs succeeding processes to causing the display unit 216 to display the print setting screen. Alternatively, these processes may start at other times. For example, these processes may start when the object 1104 in the UI of the document creation application 315 is selected.

As described above, in a case where a print queue and the print setting extension application 312 are associated with each other, selection of the print queue triggers the process of displaying the print setting screen (see FIGS. 10A to 10E) of the print setting extension application 312 and the succeeding processes, which are printing processing using the cloud print service unit 321 and the print setting extension application 312. Next, a detailed description will now be given of examples of PDF pass-through printing.

First Example

Figure 13A:
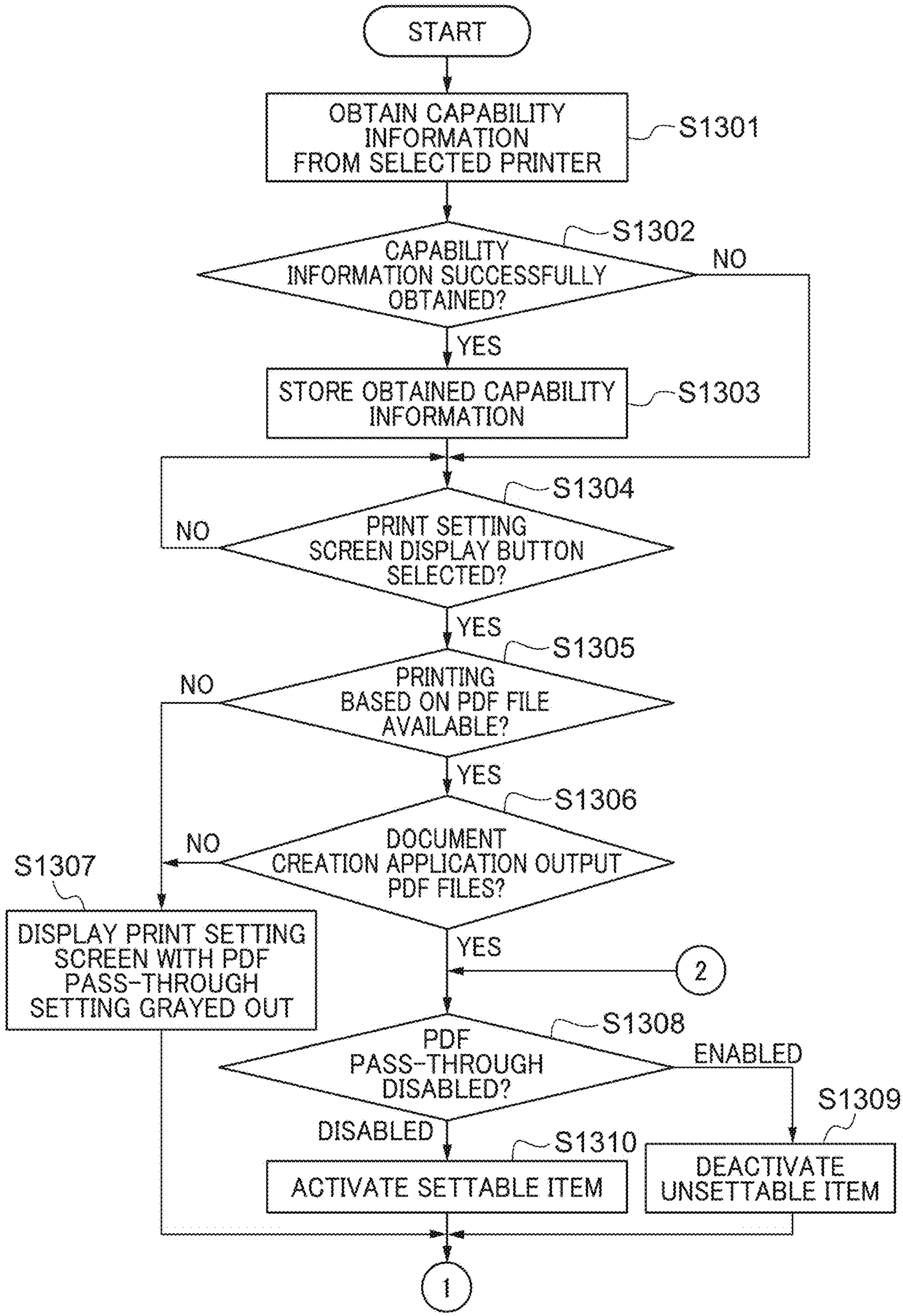
FIGS. 13A and 13B are flowcharts illustrating a process that is carried out by the client terminal in the first example.
Figure 13B:
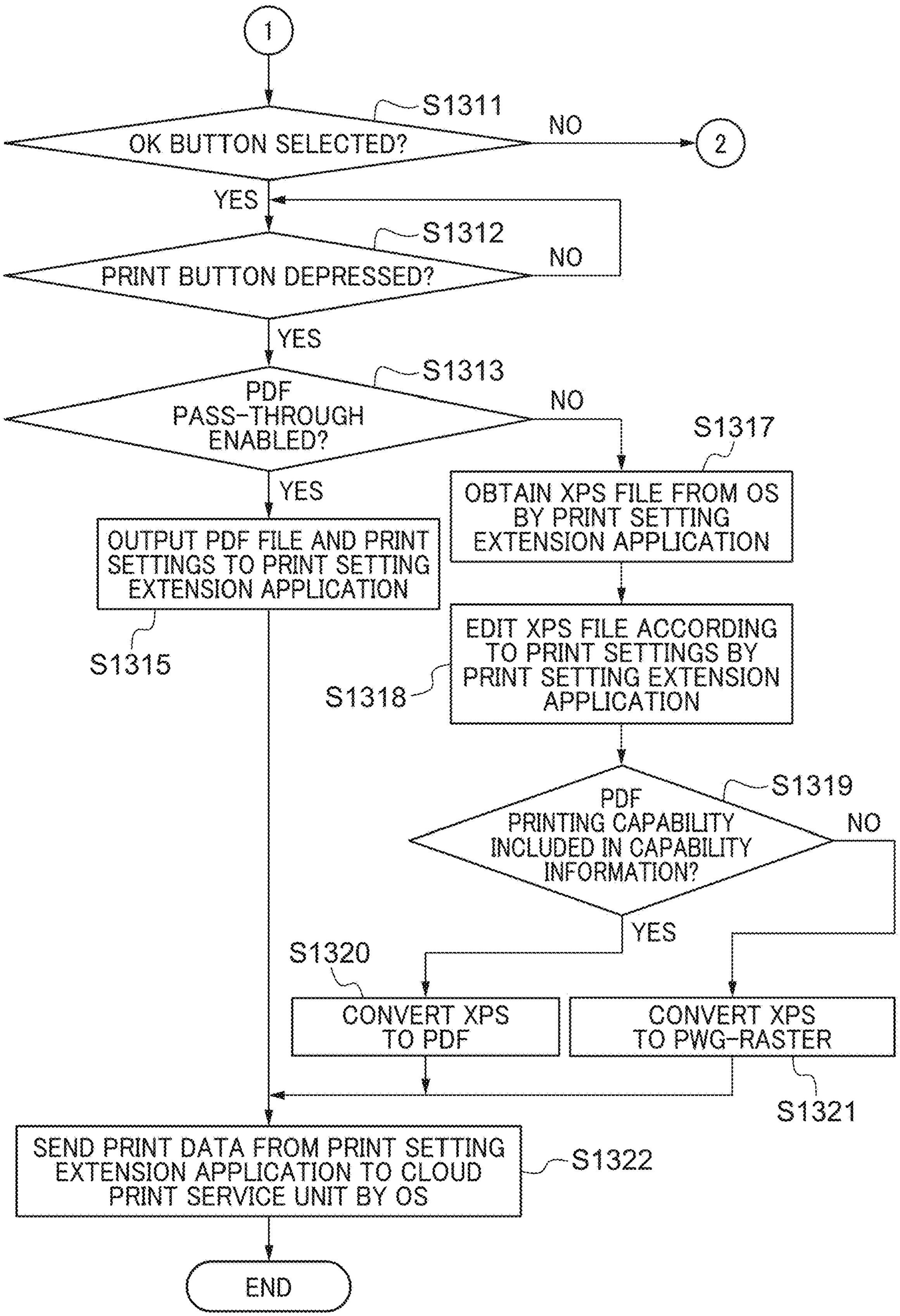

FIGS. 13A and 13B are flowcharts of a process that is carried out by the client terminal 101 in a first example. Referring to FIGS. 13A and 13B, a description will be given of a process in which the client terminal 101 presents the list box 1003 for the PDF pass-through setting 501 through the print setting extension application 312 to a user, and the user configures the PDF pass-through setting 501. This process is implemented by a program stored in the memory 213 in FIG. 2A being loaded, and the CPU 212 executing the loaded program.

The process begins when the client terminal 101 is started and the print setting screen (see FIG. 11) of the document creation application 315 is displayed by the display unit 216. In the following description, it is assumed that a printer name for a print queue associated with the print setting extension application 312 has been selected in the object 1101 in FIG. 11.

In S1301, the CPU 212 obtains via the network 107 capability information configured in the selected printer. The process in S1301 is carried out by the CPU 212 executing the print setting extension application 312.

Next, in S1302, the CPU 212 determines whether or not the print setting extension application 312 has successfully obtained the capability information. When the CPU 212 determines that the capability information on the printer has been obtained successfully (YES in S1302), the process proceeds to S1303, in which the CPU 212 stores the "capability information" on the printer associated with the selected print queue in the storage unit 214. On the other hand, when the CPU 212 determines that the capability information on the printer has not been obtained (NO in S1302), the process skips S1303 and proceeds to S1304.

In S1304, the CPU 212 determines whether or not the object 1104 for other settings in the print setting screen in FIG. 11 has been selected. When the CPU 212 determines that the object 1104 for other settings has not been selected (NO in S1304), it goes into a wait state in S1304. That is, the CPU 212 repeatedly carries out the process in S1304 until the object 1104 for other settings is selected. On the other hand, when the CPU 212 determines that the object 1104 for other settings has been selected (YES in S1304), the process proceeds to S1305.

When the object 1104 for other settings is selected, the document creation application 315 provides a notification to the OS 313. In response to this notification, the OS 313 selects the print setting extension application 312 associated with the print queue for the selected printer name and causes the print setting extension application 312 to display the extended print setting screen. In S1305, based on the capability information obtained in S1301, the CPU 212 determines whether or not the printer with the selected printer name is capable of performing printing based on a PDF file. When based on the capability information obtained in S1301, the CPU 212 determines that the printer with the selected printer name is capable of performing printing based on a PDF file (YES in S1305), the process proceeds to S1306, and otherwise (NO in S1305), the process proceeds to S1307.

The determination of the capability of the printer to perform PDF-based printing is made based on whether or not there is a character string "PDF" in the description of data conversion in FIG. 17. When there is not capability information including information indicating PDF-based printing (NO in S1305), the process proceeds to S1307. On the other hand, when there is capability information indicating PDF-based printing (YES in S1305), the process proceeds to S1306.

In S1306, the CPU 212 determines whether or not the document creation application 315 outputs PDF files. The process in S1306 is implemented by the CPU 212 executing a program of the print setting extension application 312. The CPU 212 makes the determination in S1306 based on, for example, whether or not there is a character string "% PDF" at the beginning of actual data in a print file created by the document creation application 315. The process in S1306 is implemented by the CPU 212 executing the print setting extension application 312. Alternatively, the process in S1306 may be carried out in a manner described below.

The CPU 212 obtains an identifier for an application that issued an instruction to display a print setting screen according to the program of the print setting extension application 312. When the identifier obtained by the CPU 212 matches an identifier for a predetermined application, it may be determined that the document creation application 315 outputs PDF files, and the process may proceed to S1308. It should be noted that the identifier for the application that instructed the print setting extension application 312 to display a print setting screen is obtained using API (Application Programming Interface) provided by the OS 313.

Figure 20:
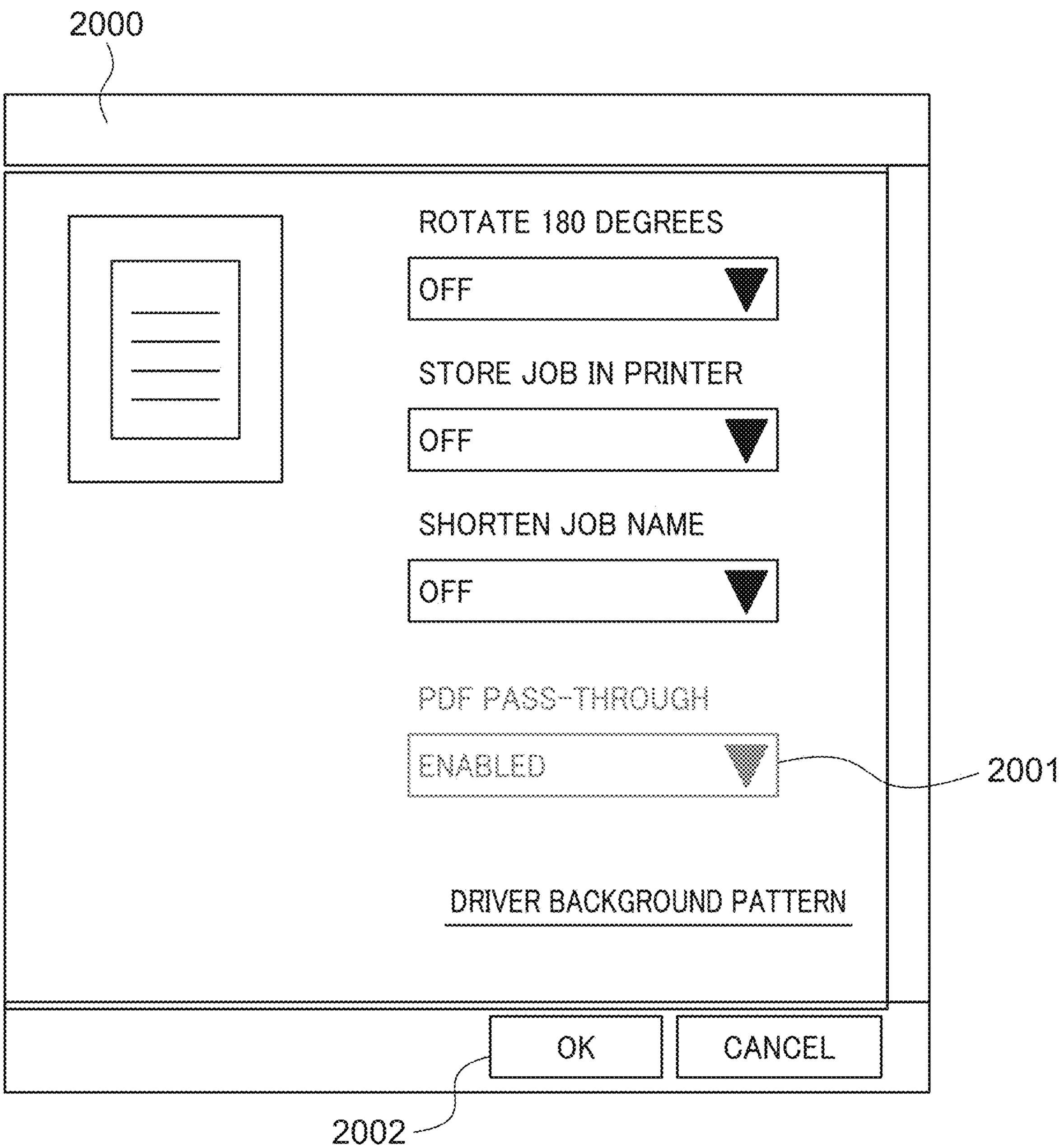
FIG. 20 is a diagram illustrating an example of a print setting screen displayed on the client terminal in a case where print data is not PDF data or an image forming apparatus does not have PDF—based processing capability.

In S1307, according to the print setting extension application 312, the CPU 212 causes the display unit 216 to display a print setting screen, on which a list box for setting the PDF pass-through to be enabled or disabled is grayed out. By carrying out the process in S1307, the CPU 212 causes the display unit 216 to display a print setting screen 2000 as illustrated in FIG. 20. When a user selects an OK button 2002 in the print setting screen 2000, print settings are confirmed. An object (list box 2001) for the PDF pass-through setting is grayed out so that a user cannot change the setting value from "disabled" to "enabled". On the other hand, objects for settings that cannot be used when the PDF pass-through is set to be enabled are displayed such that they can be operated. It should be noted that in the present example, the list box 1003 in FIG. 10D is grayed out so as to prevent the PDF pass-through setting from being changed. Alternatively, the list box 1003 itself may be hidden in S1307 so as to prevent the PDF pass-through setting from being set to be enabled.

In such a manner, when the format of a file output from an application is not XPS (the first format), the CPU 212 grays out the setting item for setting information indicating whether the file conversion is enabled or disabled in the screen displayed on the display unit 216. When the CPU 212 determines in S1305 that PDF-based printing is not available, the CPU 212 grays out the setting item in the same manner.

In S1308, according to the program of the print setting extension application 312, the CPU 212 obtains information indicating whether the PDF pass-through is set to be enabled or disabled and determines the setting for the PDF pass-through. The CPU 212 obtains current print setting information from the OS 313. When the CPU 212 determines that the PDF pass-through is disabled, the process proceeds to S1310, and on the other hand, when the CPU determines that the PDF pass-through is enabled, the process proceeds to S1309.

By referring to the obtained current print setting information, the CPU 212 determines whether the PDF pass-through is set to be enabled or disabled. When the PDF pass-through is determined as being disabled in S1308, the process proceeds to S1310, in which a process described below is carried out. That is, according to the program of the print setting extension application 312, the CPU 212 causes the display unit 216 to display a print setting screen on which the PDF pass-through is set to be disabled and predetermined functions are settable. In S1310, the display unit 216 displays the print setting screen as illustrated in FIG. 10D.

Figure 21:
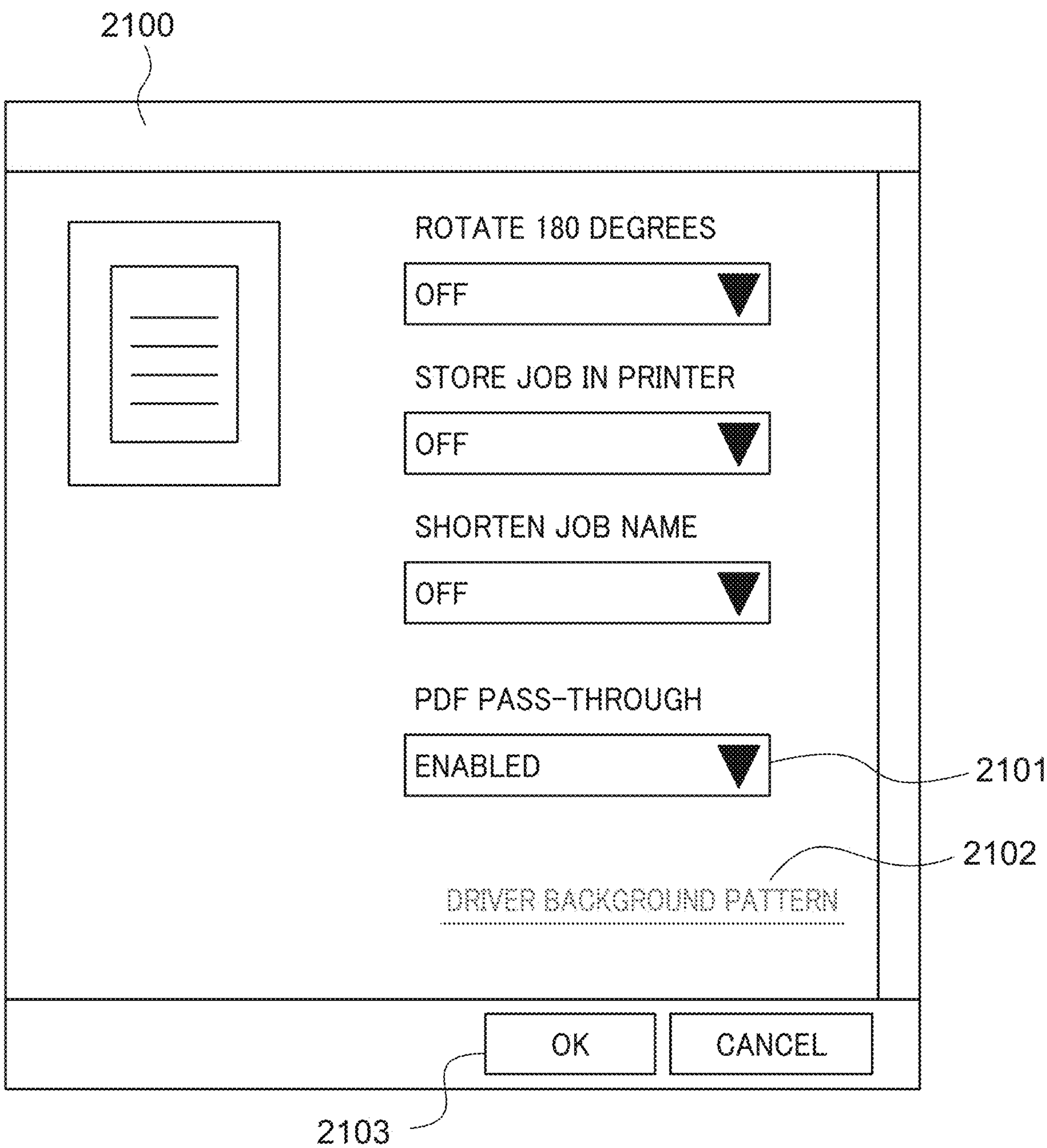
FIG. 21 is a diagram illustrating an example of a print setting screen displayed on the client terminal in a case where the image forming apparatus has PDF-based printing capability.

On the other hand, when the PDF pass-through is determined as being enabled in S1308, the process proceeds to S1309, in which the process described below is carried out. That is, according to the program of the print setting extension application 312, the CPU 212 causes the display unit 216 to display a print setting screen on which the PDF pass-through is set to be enabled and a predetermined function is grayed out. FIG. 21 illustrates an example of a print setting screen 2100 displayed by the display unit 216 in S1309. When the user selects an OK button 2103 in the print setting screen 2100, print settings are confirmed. In FIG. 21, an object (list box 2101) for the PDF pass-through setting indicates that the PDF pass-through is set to be enabled, whereas an object 2102 for a driver background pattern is grayed out.

Then, in S1311, according to the program of the print setting extension application 312, the CPU 212 determines whether or not the OK button 1002 has been selected. When the CPU 212 determines that the OK button 1002 has not been selected (NO in S1311), the process returns to S1308. In the subsequent processes S1308 and S1311, the display relating to the PDF pass-through is not changed unless the PDF pass-through setting is changed. When a user changes the PDF pass-through setting, the process in S1310 or S1308 is carried out according to this change.

In S1311, when the CPU 212 determines that the OK button 1002 has been selected, the CPU 212 sends the current print setting information to the OS 313 to end the display of the print setting screen according to the program of the print setting extension application 312. As a result, the screen in FIG. 11 is displayed on the display unit 216. In this case, the display unit 216 displays the initial print setting screen that reflects print settings configured via the print setting screen provided by the print setting extension application 312.

In S1312, according to the program of the document creation application 315, the CPU 212 determines whether or not the print button 1105 has been depressed (selected). When the CPU 212 determines that the print button 1105 has not been depressed (selected) (NO in S1312), the process proceeds to S1312, in which the CPU 212 goes into a wait state. When print settings are changed via the initial print setting screen during this period, a print setting information changing process is carried out. Moreover, when an instruction to display the extended print setting screen is issued again during this period, the CPU 212 carries out the processes in S1305 to S1311.

On the other hand, when the CPU 212 determines that the print button 1105 has been depressed (selected) (YES in S1312), the CPU 212 notifies the OS 313 that an instruction to perform printing has been issued. Then, in S1313, the CPU 212 executes a program of the OS 313 to obtain the print settings and determines whether or not the PDF pass-through is set to be enabled. When the CPU 212 determines that the PDF pass-through is set to be enabled (YES in S1313), the process proceeds to S1315, and otherwise (NO in S1313), the process proceeds to S1317. In S1315, by executing the program of the print setting extension application 312, the CPU 212 writes the PDF file output from the document creation application 315 and the print settings into an area from which they can be read out by the print setting extension application 312. At this time, the CPU 212 sends the PDF file as it is to the print setting extension application 312 without changing the contents of the PDF file.

A description will now be given of an operation in a case where the PDF pass-through is set to be disabled (NO in S1313). In S1317, according to the program of the OS 313, the CPU 212 sends XPS data obtained by the conversion and print setting information to the print setting extension application 312. That is, the print setting extension application 312 receives the XPS data obtained by the conversion and the print setting information from the OS 313. At this time, the CPU 212 also receives print setting information from the document creation application 315 according to the program of the OS 313.

Then, in S1318, according to the program of the print setting extension application 312, the CPU 212 edits the XPS data using the received print setting information. The edition of the XPS data includes the conversion of data such as the addition of a background pattern. After that, in S1319, according to the program of the print setting extension application 312, the CPU 212 refers to the capability information for the selected print queue to determine whether or not information indicating PDF-based printing is included in the capability information. When the CPU 212 determines that information indicating PDF-based printing is included in the capability information (YES in S1319), the process proceeds to S1320, in which the CPU 212 generates a PDF file from the XPS data according to the program of the print setting extension application 312. On the other hand, when the CPU 212 determines that information indicating PDF-based printing is not included in the capability information (NO in S1319), the process proceeds to S1321.

In S1320, according to the program of the print setting extension application 312, the CPU 212 converts the XPS file to a PDF file using API provided by the OS 313. The print setting information is also converted to attribute values defined by IPP. It should be noted that when the print setting information includes attribute values that are not defined by IPP, the CPU 212 does not perform the conversion for these attribute values.

On the other hand, when the CPU 212 determines in S1319 that information indicating PDF-based printing is not included in the capability information (NO in S1319), the CPU 212 generates PWG-Raster file according to the program of the print setting extension application 312 in S1321. According to the program of the print setting extension application 312, the CPU 212 converts the XPS file to a PWG-Raster file using API of the OS 313. It should be noted that in S1321, the CPU 212 converts the print setting information to attribute values defined by IPP as with S1320.

Finally, in S1322, according to the program of the print setting extension application 312, the CPU 212 registers the generated image data and print settings in the print queue. According to the program of the OS 313, the CPU 212 sends the registered image data and print settings to the cloud print service unit 321 according to IPP. That is, the OS 313 sends the print data obtained from the print setting extension application 312 to the cloud print service unit 321.

The sequence of processes illustrated in FIGS. 13A and 13B is thus completed. The setting for the PDF pass-through function thus can be configured on the print setting screen provided by the print setting extension application 312. Moreover, print settings can be configured with the PDF pass-through setting 501 suitable for each printer.

Second Example

In the first example described above, when a user instructs printing, the PDF pass-through setting 501 is read from the cloud print compatible printer 104, and the setting is reflected on the list box 1003.

In a second example, the PDF pass-through setting intended by a user is automatically configured without obtaining capability information including the PDF pass-through setting 501 from the cloud print compatible printer 104. In the first example, capability information is obtained each time a print setting UI is displayed by a print support application (PSA), whereas in the second example, when a print queue is created, the CPU 212 obtains capability information once. After that, capability information for at least the PDF pass-through is not obtained when the print setting screen is displayed. As a result, processing time for printing can be shortened, and network load can be reduced.

Figure 15:
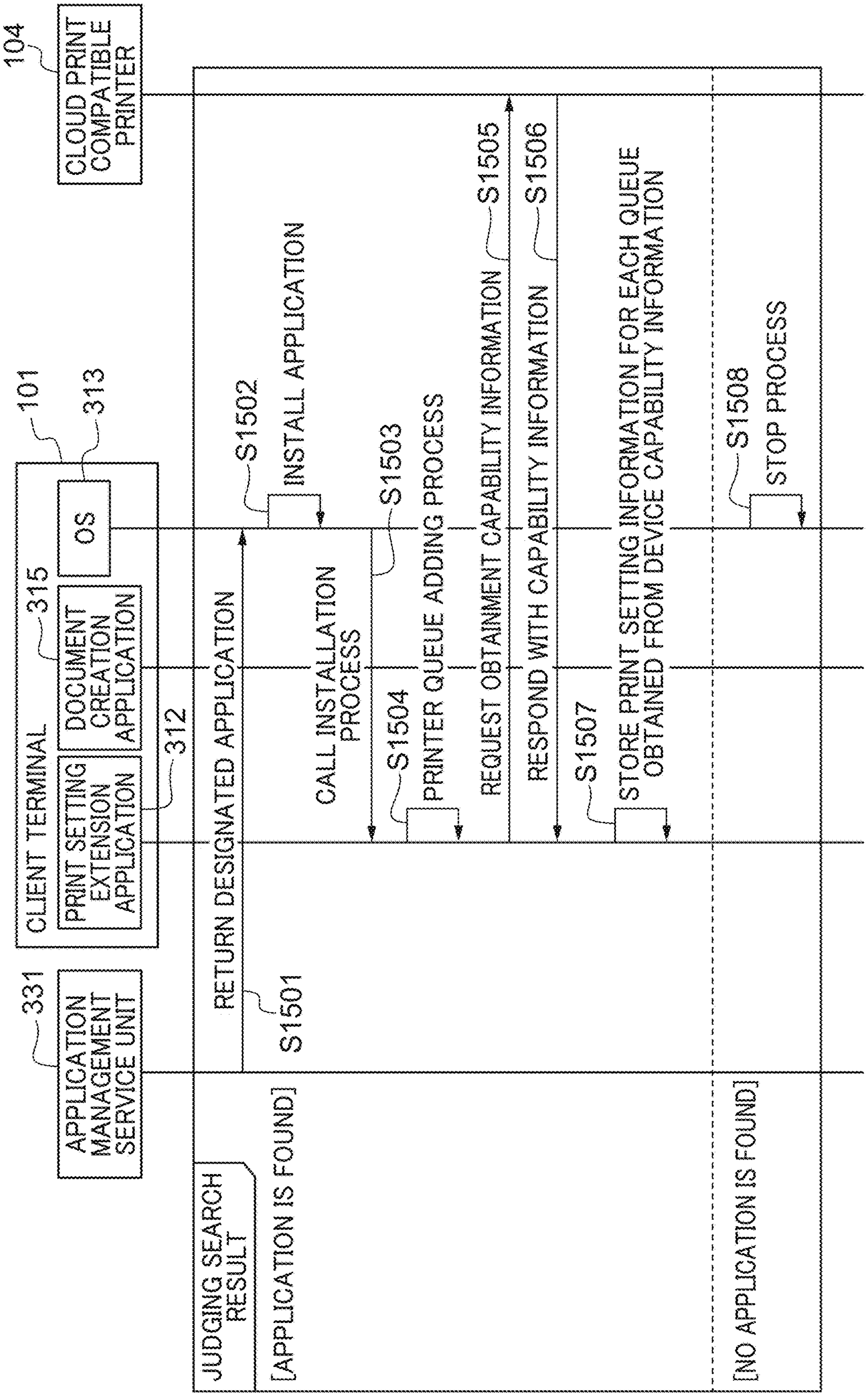
FIG. 15 is a sequence diagram illustrating a process of installing the print setting extension application in the second example.

Referring to FIG. 15, a description will be given of a process in which the print setting extension application 312 is installed in the second example. The processes from the request for printer registration in S3001 to the request for application search in S3018 in FIG. 3B are the same as in the first example. Therefore, description thereof is omitted.

First, in response to a request for application search from the OS 313, the application management service unit 331 checks whether or not a print setting extension application matching an application ID in the request is stored or held in the storage unit 234. When a print setting extension application matching the application ID is stored or held in the storage unit 234, the application management service unit 331 responds to the OS 313 with the print setting extension application 312 matching the application ID in S1501. That is, the application management service unit 331 returns a designated application to the OS 313 of the client terminal 101.

Next, in S1502, the OS 313 starts installing the print setting extension application 312 returned from the application management service unit 331. Then, in S1503, the OS 313 calls an installation process for the print setting extension application 312 associated with the printer name and HWID.

After that, in S1504, the print setting extension application 312 carries out a process in which it adds print queue information to a print queue table 1901 in FIG. 19 based on the information received from the OS 313. The print queue table 1901 holds printer names, HWIDs, and queue IDs 1902 uniquely assigned to respective print queues. In S1505 and S1506, the print setting extension application 312 obtains capability information from the cloud print compatible printer 104 in the same manner as in S806 and S807.

Then, in S1507, based on item names, attribute values, and default values included in the obtained capability information, the print setting extension application 312 creates queue tables 1401 in FIGS. 14A to 14C and stores them in association with the queue IDs. FIG. 14A illustrates the queue table 1401 whose queue ID is “1” and in which item names, attribute values, and default values are stored in association with one another. FIG. 14B illustrates the queue table 1401 whose queue ID is “2” and in which item names, attribute values, and default values are stored in association with one another. Likewise, FIG. 14C illustrates the queue table 1401 whose queue ID is “n” (where “n” is an integer of not less than 2) and in which item names, attribute values, and default values are stored in association with one another.

It should be noted that as a result of the search, when the application management service unit 331 has no print setting extension application matching the application ID in the request, the OS 313 stops the application installation process in S1508 as with S3021. In such a manner, the print setting extension application 312 is installed according to the second example.

Figure 16:
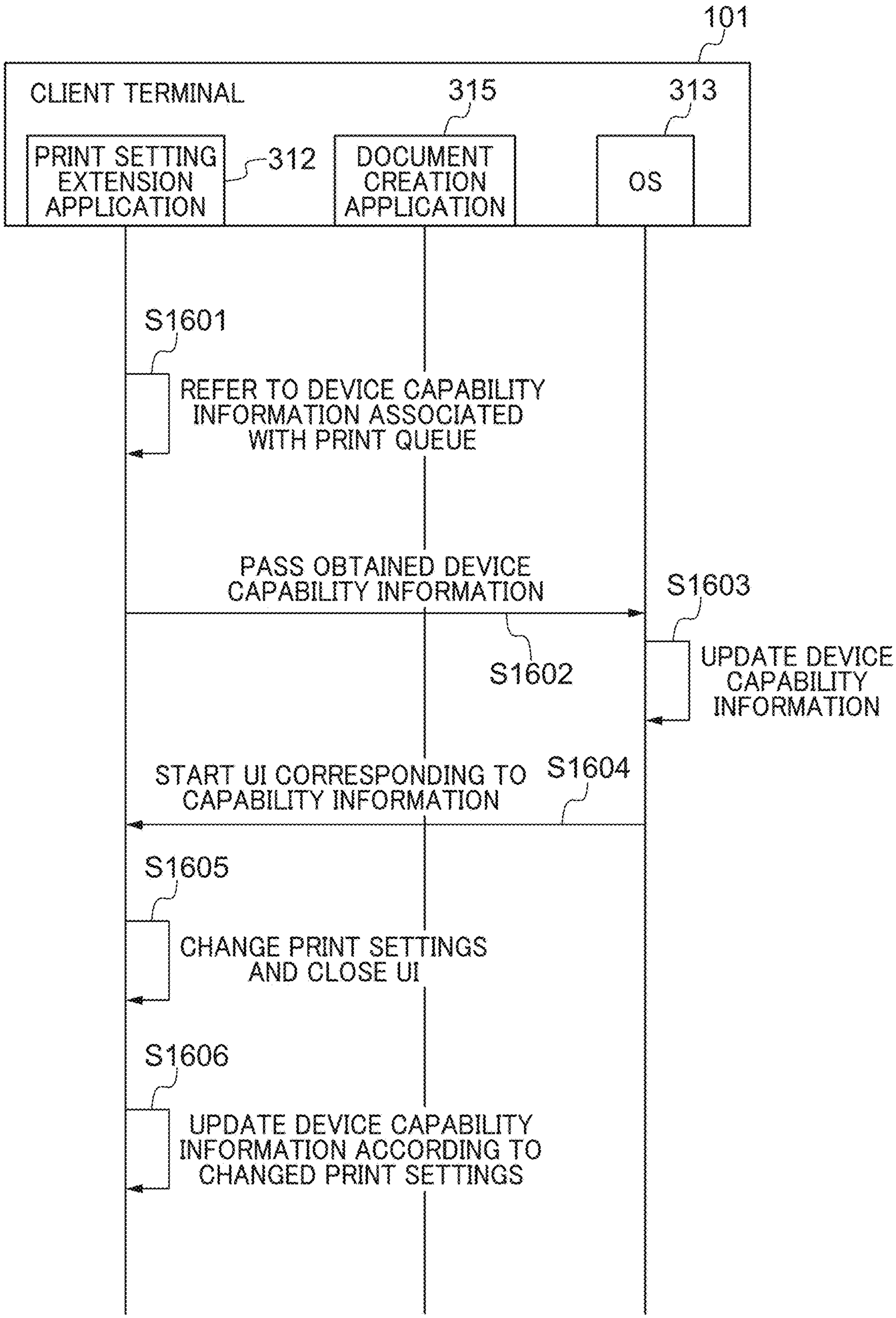
FIG. 16 is a sequence diagram illustrating an example of a print setting process that is carried out by the print setting extension application in the second example.

Referring to FIG. 16, a description will be given of an example of a printing process that is carried out by the print setting extension application 312 in the second example. It should be noted that the processes in the first example from selecting a print queue (S801) to notifying the print setting extension application 312 of an event and an API for editing device capability information (S805) are the same as those in the second example. Therefore, description of the processes thereof is omitted for the second example.

First, in S1601, in response to an event notification from the OS 313, the print setting extension application 312 refers to the queue table 1401 (see FIGS. 14A to 14C) associated with a print queue. Next, in S1602, the print setting extension application 312 edits device capability information by assigning the setting values for respective setting items in the queue table 1401 to default setting values of the setting items, and then passes the edited device capability information to the OS 313, where the setting items includes the PDF pass-through setting. Subsequent processes in S1603 to S1606 are the same as those in S810 to S812 described above, and hence description thereof is omitted. Then, in S1606, the print setting extension application 312 applies a change of print settings made by a user to the queue table 1401. That is, as in FIG. 16, the print setting extension application 312 updates the device capability information according to the print settings changed by a user.

With the processes described above, printing can be performed using print settings suitable for every user without obtaining device capability information stored in a printer at the time of printing. This is the end of the description of the print setting extension application 312 and the entire printing process using the print setting extension application 312. A description will now be given of a process relating to the PDF pass-through.

Figure 18A:
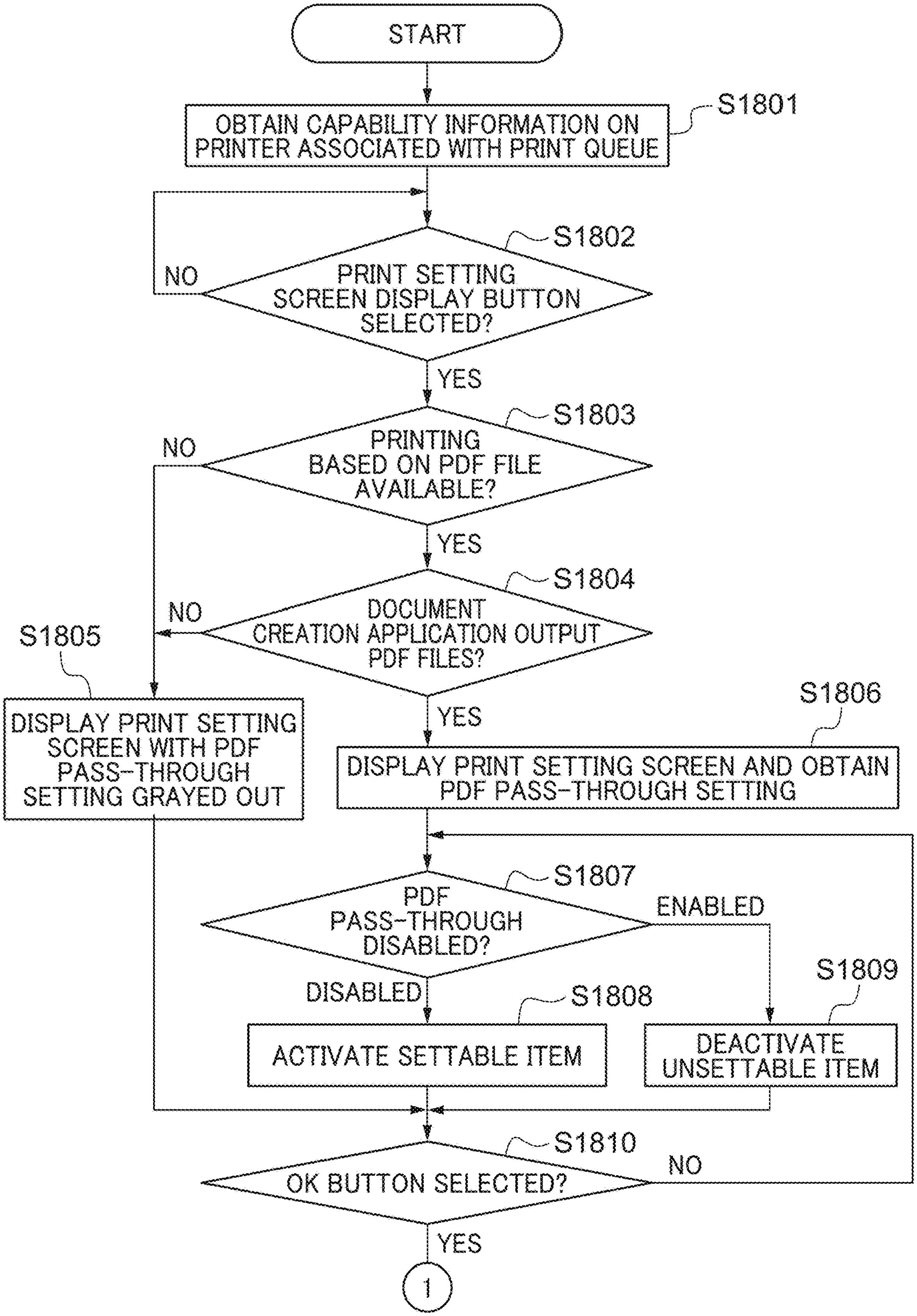
FIGS. 18A and 18B are flowcharts illustrating a process of configurating a list box by the print setting extension application in the second example.
Figure 18B:
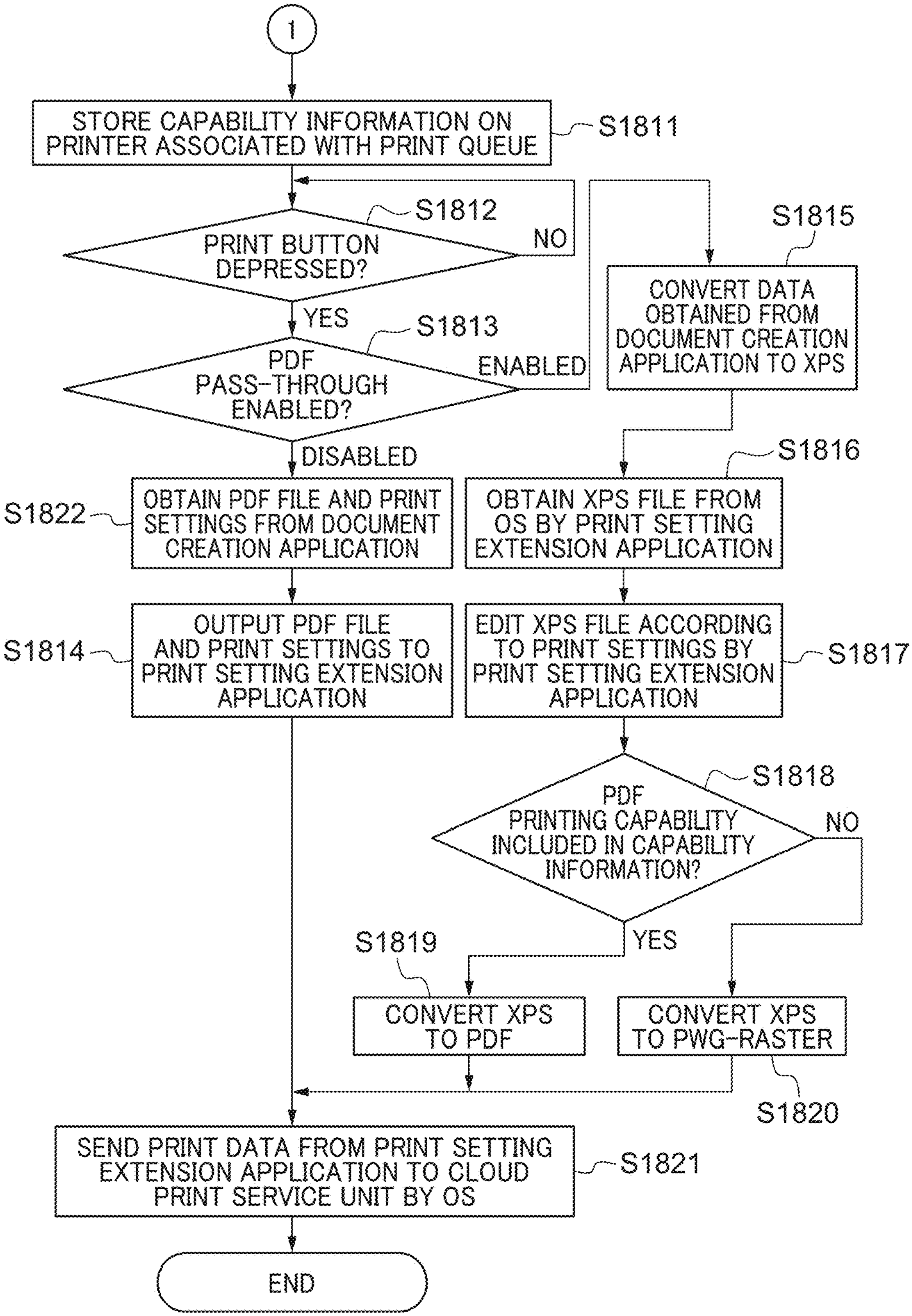

Referring to FIGS. 18A and 18B, a description will now be given of a process in which the print setting extension application 312 configures the list box 1003 according to the PDF pass-through setting 501 in the second example. This process is implemented by the CPU 212 executing a program loaded into the memory 213 in FIG. 2A.

The process begins when the client terminal 101 is started and the print setting screen (see FIG. 11) of the document creation application 315 is displayed by the display unit 216. In the following description, it is assumed that a printer name for a print queue associated with the print setting extension application 312 has been selected in the object 1101 in FIG. 11.

In S1801, the CPU 212 obtains capability information on a printer stored in association with the print queue for the selected printer name. The process in S1801 is implemented by the CPU 212 executing the print setting extension application 312. Processes in S1802 to S1810 are the same as those in S1305 to S1313 in FIG. 13B, and hence description thereof is omitted.

When the OK button 1002 is selected in S1810 (YES in S1810), the CPU 212 sends current print settings made on the print setting screen to the OS 313 according to the program of the print setting extension application 312 in S1811. The CPU 212 then stores the current print settings in the queue table 1401 associated with the print queue. The setting information stored here is loaded when the process in S1801 is carried out after this time so that print settings corresponding to an intended print queue can be configured. It should be noted that processes in S1812 to S1822 are the same as those in S1312 to S1322 in FIG. 13B, and hence description thereof is omitted.

The process in FIGS. 18A and 18B is thus completed. It achieves an effect such that the PDF pass-through setting can be configured on the print setting screen provided by the print setting extension application 312. Moreover, an effect of configuring print settings with the PDF pass-through setting 501 suitable for every printer is achieved.

In the first example and the second example described above, a PDF file and print capability information is sent from the client terminal 101 to a printer via the cloud print service unit 321. Alternatively, the above examples may also be applied to a case where the client terminal 101 and the cloud print compatible printer 104 are directly connected together without the cloud print service unit 321.

Moreover, in the first example and the second example, when a user selects the object 1104 for other settings in the initial print setting screen in FIG. 11, the print setting screen of the print setting extension application 312 is displayed so that the PDF pass-through can be set to be enabled or disabled. Alternatively, when a user selects the print button 1105 on the initial print setting screen in FIG. 11, an object for setting the PDF pass-through to be enabled or disabled may appears on the initial print setting screen.

In this case, the print setting extension application 312 may display, on the initial print setting screen, objects for setting items relating to the PDF pass-through function together with the object for setting the PDF pass-through to be enabled or disabled. Examples of the objects for setting items relating to the PDF pass-through function include an object for a setting item (e.g., background pattern setting) that may prohibit the PDF pass-through printing, and an object for a password used for opening a PDF file.

The embodiments of the present invention can also be implemented by carrying out a process described below. That is, software (programs) that implements the embodiments described above are supplied to a system or apparatus via a network or recording medium. A computer (e.g., a processor such as a CPU or MPU) of the system or apparatus computer reads out and executes program codes. In this case, the computer programs and the recording medium that stores the computer programs also constitute the present invention. Moreover, although in the embodiments described above, capability information and print data are communicated between the client terminal 101 and the cloud print compatible printer 104 via the cloud print service unit 321, they may be sent directly to the cloud print compatible printer 104.

According to the embodiments described above, the client terminal 101 (information processing apparatus) is capable of operating the cloud print compatible printer 104 (printing device) communicably connected to the client terminal 101. The CPU 212 of the client terminal 101 converts an XPS file (first format file) output from a document creation application to a PDF file (second format file) (S1320).

The CPU 212 obtains, from the cloud print compatible printer 104, print setting information on print settings including information indicating whether the file conversion is enabled or disabled from the cloud print compatible printer 104 (e.g. S1308). The CPU 212 determines whether or not to convert a file output from a document creation application according to the information indicating whether the file conversion is enabled or disabled obtained from the cloud print compatible printer 104 (S1309, S1310). That is, according to the information indicating whether the file conversion is enabled or disabled included in the obtained print setting information, the CPU 212 sets the processing mode to either the mode in which the file conversion is performed on a file output from a document creation application or a mode in which a file output from a document creation application is output as it is without being subjected to the file conversion.

The CPU 212 then carries out the process described below (S1322). According to whether or not to perform the file conversion (the processing mode set by the CPU 212), the CPU 212 transmits, to the cloud print compatible printer 104, print data generated based on either the file output from the document creation application or a file obtained by performing the file conversion on the file output from the document creation application.

The processes described above eliminate operations of users to set, for each printing, whether to print a file output from a document creation application after conversion of the format of the file or print a file output from a document creation application without the conversion, so as to match the cloud print compatible printer 104 to be used for the printing.

Specifically, in a case where the mode in which the conversion is performed on a file output from a document creation application is set, the CPU 212 transmits, to the cloud print compatible printer 104, print data generated based on a file obtained by converting the file output from the document creation application. On the other hand, in a case where the mode in which the conversion is not performed on a file output from a document creation application is set, the CPU 212 transmits, to the cloud print compatible printer 104, print data generated based on the file output from the document creation application without being subjected to the conversion.

The CPU 212 may store or hold the obtained print setting information obtained from the cloud print compatible printer 104 in the storage unit 214 (storage device). Accordingly, the CPU 212 may set whether or not to perform the conversion on a file output from an application, based on the print setting information stored or held in the storage unit 214. That is, based on the print setting information held in the storage unit 214, the CPU 212 may set the processing mode to either the mode in which the file conversion is performed on a file output from a document creation application or the mode in which the file conversion is not performed on a file output from a document creation application.

Another aspect of the present invention provides the client terminal 101 (information processing apparatus) as follows. The client terminal 101 is capable of operating the cloud print compatible printer 104 (printing device), which is communicably connected to the client terminal 101, using the print setting extension application 312 that supports the function of a standard driver installed on the OS of the information processing apparatus. The CPU 212 obtains from the cloud print compatible printer 104 (printing device) capability information, where the capability information includes information indicating whether the file conversion is enabled or disabled (S806, S807). The CPU 212 also converts an XPS file (first format file) output from a document creation application to a PDF file (second format file).

According to the information indicating whether the file conversion is enabled or disabled included in the obtained capability information, the CPU 212 determines whether or not to convert a file output from a document creation application (e.g. S812). That is, according to the information indicating whether the file conversion is enabled or disabled included in the obtained capability information, the CPU 212 sets the processing mode to either the mode in which the conversion is performed on a file output from a document creation application or the mode in which a file output from a document creation application is output as it is without being subjected to the conversion. The CPU 212 then carries out the process described below (S813 to S819). According to whether or not to perform the file conversion (the processing mode set by the CPU 212), the CPU 212 transmits, to the cloud print compatible printer 104, print data generated based on either a file output from a document creation application or a file obtained by converting the file.

The processes described above also eliminate operation of users to set, for each printing, whether to print a file output from a document creation application after conversion of the format of the file or print a file output from a document creation application without the conversion, so as to match the cloud print compatible printer 104 to be used for the printing. The obtained capability information includes setting items, attribute values which are options settable to the setting items, and default values of the setting items. The setting items include a setting item for setting whether to enable or disable the file conversion. The capability information may include setting items and attribute values which are options for the setting items, defined by a device vender on its own. Queue identifiers (queue IDs) may be associated with the respective queue tables 1401 (see FIGS. 14A to 14C) each storing setting items, attribute values which are options for the setting items, and setting items set from the attribute values for the setting items.

It should be noted that print data in the client terminal 101 may be directly sent to the cloud print compatible printer 104 without the cloud print server 102. In this case, for example, the client terminal 101 and the cloud print compatible printer 104 may be connected so that they can wirelessly communicate with each other.

Moreover, a mobile terminal such as a smartphone or a tablet terminal as well as a PC may be used as the client terminal 101. For example, when a smartphone is used, a dedicated application for implementing the processes in the above-described embodiments should be downloaded from a specific website and installed into the smartphone. In a case where the smartphone and the cloud print compatible printer 104 are relatively close to each other, communication between the two may be enabled by, for example, Bluetooth communication.

Furthermore, a mobile terminal may be connected to the Internet via a rechargeable mobile Wi-Fi router, and a printing device may be connected to the Internet via a wired or wireless router. To connect the printing device to the rechargeable mobile Wi-Fi router via a wired connection, the printing device should be configured to have a port for a LAN cable. The mobile terminal and the printing device are thus connected together via a network such as the Internet such that they can communicate with each other. Moreover, a use of the rechargeable mobile Wi-Fi router allows users to carry out the processes according to the above-described embodiments at mobile destinations of their respective mobile terminals.

Furthermore, the printing system may employ a display unit capable of displaying a display user interface (UI) as a three-dimensional image for easy visual confirmation. For example, wearable display devices, such as goggles or special eyeglasses, may be used so that users wearing them can visually confirm a display UI as a three-dimensional image.

In addition, to configure the PDF pass-through setting, a highlighted object for configuring the PDF pass-through setting may be displayed on the display unit 216 to increase visibility so that users can easily check the setting. Examples of highlighting the object for configuring the PDF pass-through setting include, but not limited to, highlighting the object by color, and enlarging the object in comparison with objects for other setting items. When the PDF pass-through setting is configured, a popup message to that effect may appears on a print setting screen or a display UI then is immediately hidden so that users can easily confirm the configuration.

When objects indicating the results of search for printers and scanners connected to the client terminal 101 via a wired or wireless connection are displayed on the printer management screen (see FIG. 4), they may be displayed based on a past usage history so that users can easily perform a selecting operation. In this case, an object for a device used frequently in the past may be highlighted by making it larger than objects for the other devices or displaying it in a different color from the other objects. The objects may be displayed in a vertical direction but also in a horizontal direction or in a matrix form (thumbnail form). In this case, information indicating the order of usage frequency may be additionally displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-097839, filed on Jun. 14, 2023, which is hereby incorporated by reference herein in its entirety.

What is claimed is:

1. A non-transitory computer-readable storage medium storing an application program for causing a computer to execute a control method for an information processing apparatus that operates a printing device communicably connected to the information processing apparatus, the control method comprising:

performing a conversion of a first format file output from a document creation application into a second format file;

obtaining print setting information on print settings from the printing device, the print setting information including information indicating whether the conversion is enabled or disabled;

according to the information indicating whether the conversion is enabled or disabled included in the obtained print setting information, setting a processing mode for a file output from the document creation application to either a mode in which the conversion is performed on a file output from the document creation application or a mode in which a file output from the document creation application is output as it is without being subjected to the conversion; and transmitting print data to the printing device, the print data being generated based on either the file output from the document creation application or a file obtained by performing the conversion on the file output from the document creation application, according to the set processing mode.

2. The non-transitory computer-readable storage medium according to claim 1, wherein the transmitting print data includes transmitting to the printing device print data generated based on the file obtained by performing the conversion on the file output from the document creation application, in a case where the processing mode is set to the mode in which the conversion is performed on a file output from the document creation application, and transmitting to the printing device print data generated based on the file output from the document creation application without being subjected to the conversion, in a case where the processing mode is set to the mode in which a file output from the document creation application is output as it is without being subjected to the conversion.

3. The non-transitory computer-readable storage medium according to claim 1, wherein according to information indicating that the conversion is enabled included in the obtained print setting information, the processing mode is set to the mode in which the conversion is performed on a file output from the document creation application.

4. The non-transitory computer-readable storage medium according to claim 1, wherein according to information indicating that the conversion is disabled included in the obtained print setting information, the processing mode is set to the mode in which a file output from the document creation application is output as it is without being subjected to the conversion.

5. The non-transitory computer-readable storage medium according to claim 1, wherein the control method further comprises holding the obtained print setting information in a storage device of the information processing apparatus.

6. The non-transitory computer-readable storage medium according to claim 5, wherein the control method comprises setting the processing mode to either the mode in which the conversion is performed on a file output from the document creation application or the mode in which a file output from the document creation application is output as it is without being subjected to the conversion, based on the print setting information held in the storage device.

7. The non-transitory computer-readable storage medium according to claim 1, wherein the control method further comprises causing a display of the information processing apparatus to display a screen that reflects the information indicating whether the conversion is enabled or disabled included in the obtained print setting information.

8. The non-transitory computer-readable storage medium according to claim 7, wherein the control method further comprises, in a case where the file output from the document creation application is not the second format file, graying out a setting item for enabling or disabling the conversion on the screen.

9. The non-transitory computer-readable storage medium according to claim 1, wherein an XPS format file output from the document creation application is converted to a PDF file in the conversion.

10. A control method for an information processing apparatus that operates a printing device communicably connected to the information processing apparatus, the control method comprising:

performing a conversion of a first format file output from a document creation application into a second format file;

obtaining print setting information on print settings from the printing device, the print setting information including information indicating whether the conversion is enabled or disabled;

according to the information indicating whether the conversion is enabled or disabled included in the obtained print setting information, setting a processing mode for a file output from the document creation application to either a mode in which the conversion is performed on a file output from the application or a mode in which a file output from the document creation application is output as it is without being subjected to the conversion; and transmitting print data to the printing device, the print data being generated based on either the file output from the document creation application or a file obtained by performing the conversion on the file output from the document creation application, according to the set processing mode.

11. An information processing apparatus that operates a printing device communicably connected to the information processing apparatus, the information processing apparatus comprising:

a memory storing instructions; and at least one processor that executes the instructions to:

perform a conversion of a first format file output from a document creation application into a second format file;

obtain print setting information on print settings from the printing device, the print setting information including information indicating whether the conversion is enabled or disabled;

according to the information indicating whether the conversion is enabled or disabled included in the obtained print setting information, set a processing mode for a file output from the document creation application to either a mode in which the conversion is performed on a file output from the application or a mode in which a file output from the document creation application is output as it is without being subjected to the conversion; and transmit print data to the printing device, the print data being generated based on either the file output from the document creation application or a file obtained by performing the conversion on the file output from the application, according to the set processing mode.

12. The information processing apparatus according to claim 11, further comprising a storage device that holds the obtained print setting information.

13. The information processing apparatus according to claim 11, further comprising a display, wherein the at least one processor executes the instructions to cause the display to display a screen that reflects the information indicating whether the conversion is enabled or disabled included in the obtained print setting information.

14. A non-transitory computer-readable storage medium storing an application program for causing a computer to execute a control method for an information processing apparatus that operates a printing device communicably connected to the information processing apparatus, the application program supporting a function of a standard driver installed on an operating system of the information processing apparatus, the control method comprising:

performing a conversion of a first format file output from a document creation application into a second format file;

obtaining capability information from the printing device, the capability information including information indicating whether the conversion is enabled or disabled;

according to the information indicating whether the conversion is enabled or disabled included in the obtained capability information, setting a processing mode for a file output from the document creation application to either a mode in which the conversion is performed on a file output from the document creation application or a mode in which a file output from the document creation application is output as it is without being subjected to the conversion; and transmitting print data to the printing device, the print data being generated based on either the file output from the document creation application or a file obtained by performing the conversion on the file output from the document creation application, according to the set processing mode.

15. The non-transitory computer-readable storage medium according to claim 14, wherein the obtained capability information includes setting items, attribute values which are options for the setting items, and default values of the setting items, the setting items including a setting item for setting whether to enable or disable the conversion.

16. The non-transitory computer-readable storage medium according to claim 15, wherein the capability information includes setting items and attribute values which are options for the setting items, defined by a device vendor.

17. The non-transitory computer-readable storage medium according to claim 15, wherein the control method further comprises associating a queue identifier with a queue table storing the setting items, the attribute values which are options for the setting items, and setting values set from the attribute values for the setting items.

18. A control method for an information processing apparatus that operates a printing device communicably connected to the information processing apparatus, using an application that supports a function of a standard driver installed on an operating system of the information processing apparatus, the control method comprising:

performing a conversion of a first format file output from a document creation application into a second format file;

obtaining capability information from the printing device, the capability information including information indicating whether the conversion is enabled or disabled;

according to the information indicating whether the conversion is enabled or disabled included in the obtained capability information, setting a processing mode for a file output from the document creation application to either a mode in which the conversion is performed on a file output from the document creation application or a mode in which a file output from the document creation application is output as it is without being subjected to the conversion; and transmitting print data to the printing device, the print data being generated based on either the file output from the document creation application or a file obtained by performing the conversion on the file output from the document creation application, according to the set processing mode.

19. An information processing apparatus that operates a printing device communicably connected to the information processing apparatus, using an application that supports a function of a standard driver installed on an operating system of the information processing apparatus, the information processing apparatus comprising:

a memory storing instructions; and at least one processor that executes the instructions to:

perform a conversion of a first format file output from a document creation application into a second format file;

obtain capability information from the printing device, the capability information including information indicating whether the conversion is enabled or disabled;

according to the information indicating whether the conversion is enabled or disabled included in the obtained capability information, set a processing mode for a file output from the document creation application to either a mode in which the conversion is performed on a file output from the document creation application or a mode in which a file output from the document creation application is output as it is without being subjected to the conversion; and transmit print data to the printing device, the print data being generated based on either the file output from the document creation application or a file obtained by performing the conversion on the file output from the document creation application, according to the set processing mode.

* * * * *